US009923793B1

(12) United States Patent
Gore et al.

(10) Patent No.: US 9,923,793 B1
(45) Date of Patent: Mar. 20, 2018

(54) CLIENT-SIDE MEASUREMENT OF USER EXPERIENCE QUALITY

(71) Applicant: Amazon Technologies, Inc., Seattle, WA (US)

(72) Inventors: Archishmat Sharad Gore, Seattle, WA (US); Sean Phillip Forde, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 182 days.

(21) Appl. No.: 14/627,924

(22) Filed: Feb. 20, 2015

(51) Int. Cl.
*G06F 15/173* (2006.01)
*H04L 12/26* (2006.01)
*H04L 29/06* (2006.01)

(52) U.S. Cl.
CPC .......... *H04L 43/0876* (2013.01); *H04L 67/42* (2013.01)

(58) Field of Classification Search
USPC .......................................... 709/217, 223, 224
See application file for complete search history.

(56) References Cited

U.S. PATENT DOCUMENTS 9,009,296 B1 * 4/2015 Siganporia .......... H04L 43/0864 709/203
2015/0088969 A1 * 3/2015 Wei ......................... H04L 67/10 709/203

OTHER PUBLICATIONS

Wang, Zhiheng and Arvind Jain. Navigation Timing [online]. W3C, Jan. 25, 2013 [retrieved on Feb. 18, 2015]. Retrieved from the Internet: <URL: https://dvcs.w3.org/hg/webperf/raw-file/tip/specs/NavigationTiming/Overview.html >.

* cited by examiner

*Primary Examiner* — Joseph E Avellino
*Assistant Examiner* — Marshall McLeod
(74) *Attorney, Agent, or Firm* — Kilpatrick Townsend & Stockton LLP

(57) ABSTRACT

Techniques are provided for measuring user-perceived client-side performance of network documents. Client-side performance data associated with a network document can be collected during the loading of the network document by a web browser of a client device, for example, by a browser-executable script. The collected performance data may include latency information respectively associated with a plurality of digital assets configured to be rendered by the network document. A subset of the collected performance data can be selectively provided. The selectively provided performance data may be associated with a subset of the plurality of digital assets that are configured to be rendered within an active portion of the network document. The active portion of the network document may indicate a current area of interest for a user of the client device such as a viewport. The selectively provided performance data may be used to improve user-perceived performance at the client device.

18 Claims, 15 Drawing Sheets

602

606 608

| Asset ID# | Time |
|---|---|
| 7 | $t_1$ |
| 2 | $t_2$ |
| 4 | $t_3$ |
| 1 | $t_4$ |
| ⋮ | ⋮ |

604

610 612

| Asset ID# | Time |
|---|---|
| 7 | $t_1 - t_0$ |
| 2 | $t_2 - t_0$ |
| 4 | $t_3 - t_0$ |
| 1 | $t_4 - t_0$ |
| ⋮ | ⋮ |

FIG. 6

CLIENT-SIDE MEASUREMENT OF USER EXPERIENCE QUALITY

BACKGROUND

When a user accesses a network resource, such as a website, user-perceived performance associated with such access can contribute to the overall user experience with the network resource, thereby affecting user decisions and even the bottom lines of the service providers. For instance, a user who experiences long response time at a retail website may be unwilling to visit the website again. Accurate and timely measurement of website performance can facilitate the identification and resolution of performance issues. However, existing performance measurement techniques focus primarily on the server-side performance that fails to account for client-side performance. Even when client-side performance is measured, such measurement is typically static and does not track user-perceived website performance as the users dynamically interact with the websites.

BRIEF DESCRIPTION OF THE DRAWINGS

Various embodiments in accordance with the present disclosure will be described with reference to the drawings, in which:

FIG. 6 illustrates example performance data that is collected for client-side performance measurements, in accordance with embodiments.

DETAILED DESCRIPTION

Figure 1:
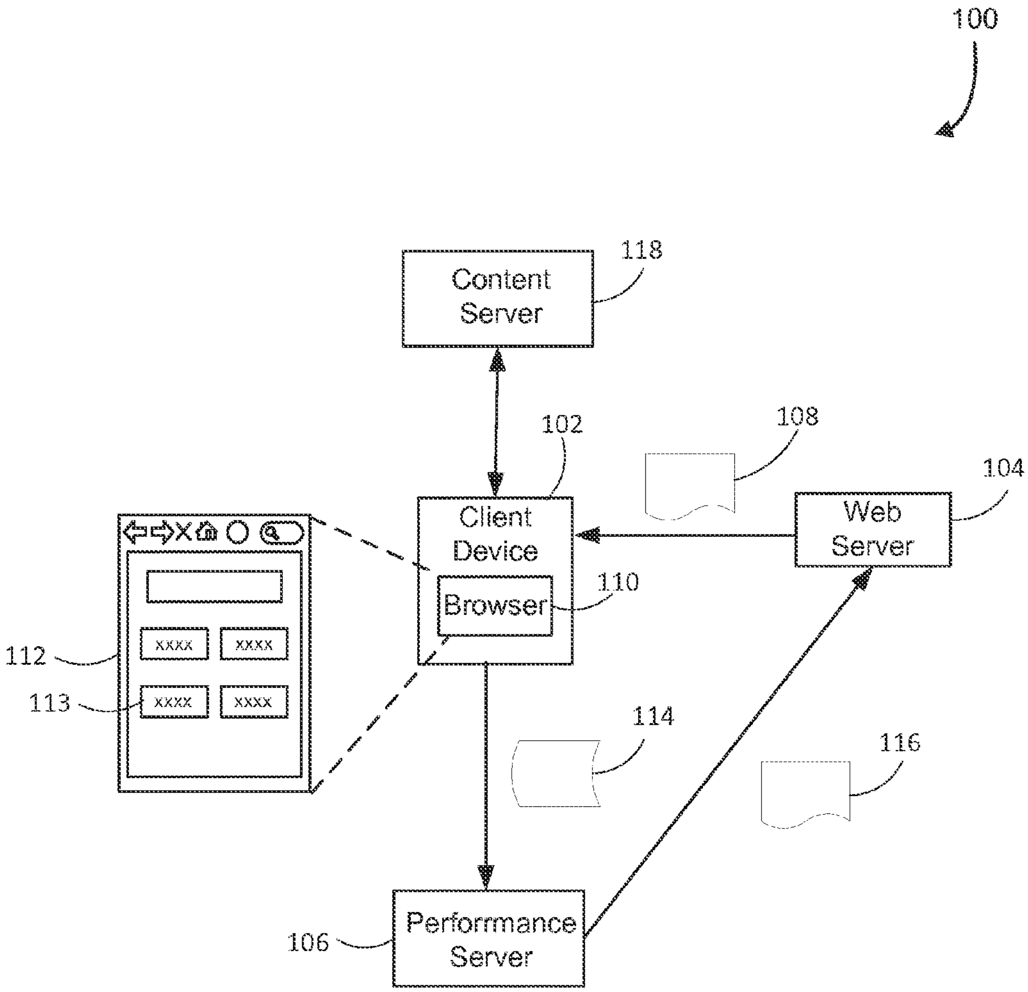
FIG. 1 illustrates an example computing environment for implementing client-side performance measurements, in accordance with embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein allow more accurate measurement of user-perceived client-side performance of network documents (e.g., web pages or the like). In particular, performance data obtained using the techniques described herein is likely to reflect a real-world view of what the users perceive at websites and hence facilitate more efficient and targeted diagnosis and improvement of content delivery.

According to aspects of the present disclosure, client-side performance data is collected for dynamic "active portions" of network documents, or web pages in order to track user-perceived or user-experienced website performance. An active portion of a web page may represent a region of a web page that is determined to be currently perceived or of interest to a user viewing the web page. For instance, an active portion of a web page may include the part of the web page that is currently visible in a web browser of a client device operated by the user. As another example, an active portion of a web page may include where the user's mouse is currently pointing at. The location and dimension of the active portion may depend on various software and/or hardware characteristics associated with the client device such as device type, display size, resolution, browser settings, and the like. Furthermore, the active portion may change dynamically due to user actions such as a user's scrolling through or zooming in/out of the browser window, changing browser window size, changing an orientation of the client device, and the like. Advantageously, collection of the client-side performance information associated with a current area of interest of a network document captures the user-perceived performance of the network document.

As an illustrative example, assume that the performance to be measured is a user-perceived load latency associated with a web page. If the user usually scrolls to the bottom of the page, then the latency that the user perceives is only determined by the load speed of the digital assets (e.g., videos or images) near the bottom of the page that are visible to the user. In this case, the optimization efforts should be focused on the bottom portion of the page. Optimizing the portion of the web page that is visible without scrolling (i.e., the "above the fold" or ATF portion of the web page) would not improve the user experience, if the part of the page the user actually sees, i.e., the bottom part, is not loaded in a timely fashion. As another example, assume that the loading of a script associated with a web page renders a web page unusable for four seconds until the script loads. In this case, even if ATF loads quickly, the web page is still unusable for the user during the four seconds. Using the disclosed technique, this latency associated with the loading of the script would be measured and used to calculate the user-perceived latency of the web page. Because the performance measurement is directly tied to user experience, it would be difficult for developers to "cheat" on performance tests by optimizing only a fixed portion of the web pages (e.g., the ATF portion).

Collection of client-side performance data may be implemented at least in part by one or more performance measurement processes (collectively, "performance collector") running on a client device. The performance collector can be implemented at least in part by a browser script provided to a client device that is executable by a web browser on the client device. The browser script can be implemented using JavaScript, VBScript, Python, or any other suitable client-side scripting language that is supported by the web browser. The browser script may be embedded in the web pages that also contain the images, videos, audios, or other digital assets to be measured. Alternatively, the browser script may be provided in a separate file. Instead of or in addition to a browser script, collection of client-side performance data can be implemented by a browser-plugin, a pre-installed client application, a mobile app, or any other suitable mechanisms.

Various client-side performance metrics can be measured for digital assets contained in web pages that are rendered by the web browser. Examples of digital assets include text, images, audios, videos, multi-media files, animations, scripts, behavior files, formatting files, and the like. Behavior files may be configured to define and organize behaviors of a web page and may include files written in JavaScript, VBScript, JScript, or any other scripting language. Formatting files may be configured to define the look and formatting of a web page and may include files written in Cascade Style Sheets (CSS) or any other style sheet language. Examples of performance metrics can include timing information, number of operations, resource usage, and the like. In particular, timing information can include latency information associated with the rendering or loading of a digital asset by the web browser, time to perform certain operations, and the like.

In some embodiments, performance data of substantially all digital assets in a web page may be collected. Alternatively, some digital assets can be configured to be excluded from (opt-out) or included in (opt-in) the performance collection process. The performance collector may be configured to check the opt-in/out information to determine whether and/or how to collect performance data for given digital assets or other measurable entities. Advantageously, such an opt-in/out mechanism can be used to provide more control over the performance collection process. As an example, certain predetermined types of digital assets may be excluded from or include in the performance collection process. As another example, an individual opt-in/out indicator may be associated with a digital asset to indicate whether the performance of the digital asset should or should not be measured. Alternatively or additionally, the opt-in/out information may indicate which specific performance metrics to measure or not measure. Note that the opt-in/out information as discussed herein may be associated with a digital asset, group of digital assets, a web page, a website, or any suitable measurable entity. In various embodiments, the opt-in/out information may be accessible from an HTML tag, a configuration file, a local or remote data store (e.g., database, cloud storage), or any other suitable location.

An active portion of a web page can be dynamically identified and used to filter the collected performance data. As discussed above, an active portion of a web page represents a region or area of a web page that is determined to be currently perceived or of interest to a user viewing the web page. For instance, the active portion of the web page may include a portion currently visible from a browser window or a sub portion of the visible portion and may be based at least in part on the screen size of the client computing device.

In various embodiments, the active portion may be identified using any suitable method. For instance, a portion of the web page that is currently visible in a browser window of the web browser (hereinafter the viewport) may be identified via Application Programming Interface (API) calls to the browser application. As another example, the current position of a user's mouse may be determined and used to define an active portion surrounding the mouse. Additionally or alternatively, any types of sensors may be used to determine an active portion of a web page displayed on a client device. Examples of such sensors include visual sensors (e.g., cameras), inertial sensors (e.g., gyroscope or accelerometers), motion sensors, proximity sensors, position sensors (e.g., global positioning system (GPS) sensor), and the like. For instance, a visual sensor may be used to track the gaze or eye movement of a user. Such tracking may be used to determine an area on the screen that the user is currently looking at or is likely to look at. As another example, sensors may be used to recognize user movement or gestures that indicate an area of interest for the user.

Once the active portion of a web page is identified, the rendering positions of the digital assets of a web page can be compared with the identified active portion to determine whether the digital assets fall within the active portion (hereinafter "active digital assets" or "critical features") or outside the active portion (hereinafter "non-active digital assets" or "non-critical features"). In some embodiments, a digital asset is determined to be within an active portion when the boundary of the digital asset at least partially overlaps with the active portion. Alternatively, a digital asset is determined to be within an active portion only when the boundary of the digital asset falls entirely inside the active portion. Regardless, performance data of the digital assets inside the active portion is selected and/or provided as the most relevant performance data because the real-world user perception of the web page is likely directly tied to the active portion.

In some embodiments, the provided performance data can include one or more performance indicators may be provided based on the selected performance data associated with the active portion. A performance indicator may be determined based on predetermined criteria or formulas. For instance, where the performance data represent latencies associated with digital assets in a web page, a maximum latency value associated an active digital asset may be selected as a user-perceived latency for the given web page. In other embodiments, a performance indicator can include a minimum, an average, a mean, a linear combination, a non-linear combination, and the like, of the performance data associated with the active digital assets.

The performance data associated with active digital assets (including or not including performance indicators) may be processed and analyzed to improve subsequent client-side performance. Such analysis can be performed by the client device that collects the performance data or a different device or system such as a remote server. Statistical analysis, data mining, or any other suitable techniques may be used to compare, analyze, or otherwise process the client-side performance data. For instance, histograms of performance metrics may be generated for a given client device or a specific group of client devices to identify temporal, geographic, demographic, or other types of correlations. Advantageously, the performance analysis process may be streamlined as compared with traditional performance analysis processes because only the performance data most relevant to user experience is used as the basis for the analysis. For the same reasons, such analysis is likely to provide relatively accurate insight into user-perceived performance issues so as to facilitate prompt and targeted resolution of such issues.

The results of the performance analysis can be used to improve client-side performance of content as perceived by users. In some embodiments, the content data provided to client devices may be optimized and/or customized based on the performance analysis. For example, if a certain digital asset in an active portion of a web page is determined to cause a performance bottleneck on a client device, said digital asset may be removed, reformatted, or the web page containing the digital asset may be otherwise modified so as to avoid the bottleneck. As another example, the difference in performance data from two groups of client devices located in two different geographic areas may be used to provide suggest that two different sets of customized content data should be provided to these two groups of client devices. As yet another example, the loading order of digital assets in a web page may be changed to optimize the performance of the digital assets located in the active portion of the web page. In other embodiments, methods for providing content data rather than the actual content data may be optimized or otherwise modified based on the performance analysis results. For instance, digital assets that are likely to be located in active portions of web pages on a client device may be provided to the client device proactively (e.g., before a request for the digital asset is made by the client device) so as to reduce the user-perceived latency when the digital asset is loaded. As another example, active digital assets may be provided to the client device (e.g., using pull or push technologies) at a higher priority than non-active digital assets to reduce user-perceived latency for the active digital assets. In various embodiments, such optimized and/or customized content delivery may be tied to specific client devices, users, accounts, or any other suitable categories of content consumers. The content consumers may be identified by their user identifiers, account identifiers, device identifiers, digital signatures, or other hardware and/or software characteristics associated with the content consumers.

FIG. 1 illustrates an example computing environment 100 for implementing client-side performance measurements, in accordance with embodiments. A client device 102 may be operably connected to a web server 104 and a performance measurement server 106 (or performance server 106) via one or more networks (not shown) to implement aspects of the present disclosure. It will be appreciated by those of ordinary skill in the art that various embodiments may have fewer or a greater number of systems, subsystems, components, and/or subcomponents than are illustrated in FIG. 1 or any other figures herein. Thus, the depiction of environment 100 in FIG. 1 or other figures should be taken as being illustrative in nature and not limiting to the scope of the disclosure. Arrows between components in FIG. 1 are used to illustrate a direction of communication between the components. While the communication between some components is shown as one-way for illustrative purposes only, it is understood that the communication between these components may be two-way in various embodiments.

The client device 102 may be configured to receive one or more network documents 108 (or web pages) from the web server 104. The one or more web documents 108 may be rendered by a web browser application 110 (hereinafter "web browser" or "browser") in a browser window 112 displayed on the client device 102. The network documents 108 can include HyperText Markup Language ("HTML"), Extensible Markup Language ("XML"), or other types of structured documents that can be executed by the browser 110. Each network document can comprise one or more elements or components such as iframe, img, object, embed, link, script, and the like. These elements or components may be used to render text, images, video or audio files, animation, user interface (UI) controls, or other digital assets 113 in a browser window 112. Some of the digital assets may be provided by the web server 104. Others may be provided by one or more content servers 118 operated by content provider(s). In some embodiments, the network documents 108 can include performance configured to measure client-side performance associated with the network documents, as discussed below. Examples of a web browser can include Internet Explorer, Mozilla Firefox, Google Chrome, Safari, and the like.

The client device 102 may be configured to provide client-side performance information 114 related to the rendering of the network documents 108 by the browser 110. The client-side performance data 114 can include timing information, numbers or types of operations, resource usage, and the like. For instance, the client-side performance data may include latency information for loading the network documents or components thereof. In general, the performance data 114 is collected as the web documents are rendered by the browser 110. However, the performance data can also be collected and/or further processed at any other suitable points in time. For example, the collected performance data 114 may be filtered, sorted, or otherwise processed by the client device 102 before being provided to the performance server 106 for further analysis. For instance, performance data associated with active portions of network documents may be selectively provided. Additionally, one or more performance indicators may be determined based on the collected performance data. Alternatively, the collected performance data may be provided substantially as-is to the performance server 106.

Figure 10:
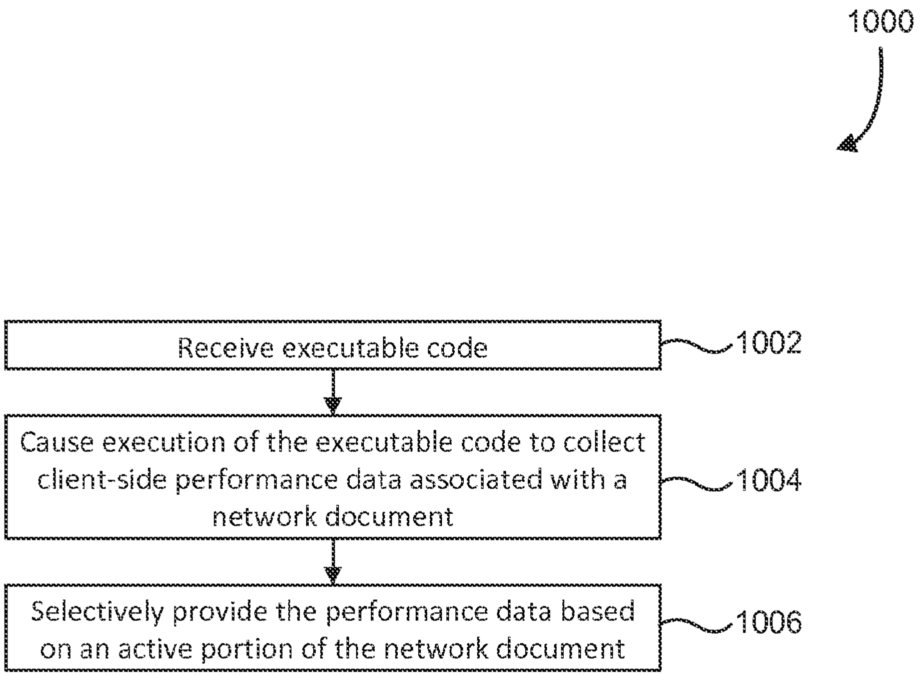
FIG. 10 illustrates an example process for implementing client-side performance measurements, in accordance with embodiments.
Figure 11:
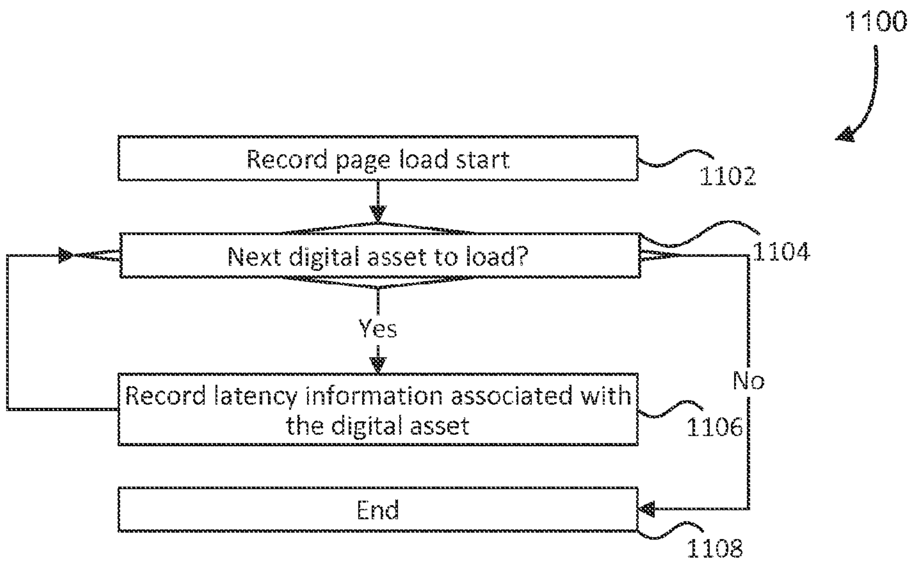
FIG. 11 illustrates an example process for collecting latency information associated with digital assets in a network document, in accordance with embodiments.
Figure 12:
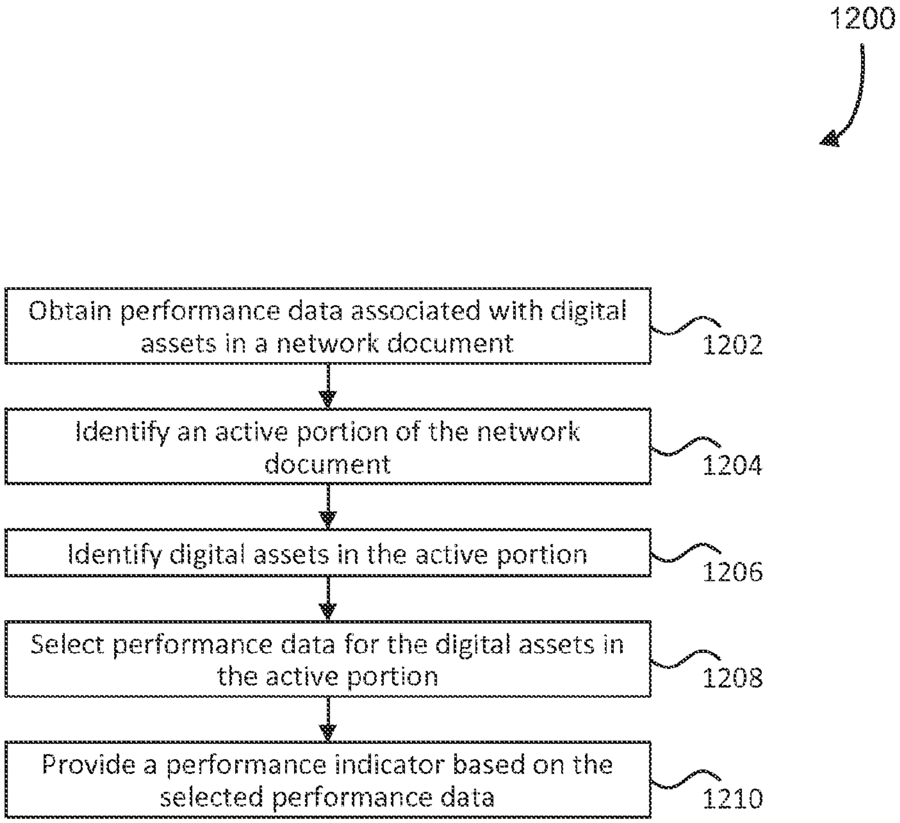
FIG. 12 illustrates an example process for selectively providing performance information associated with a network document based on an active portion of the network document, in accordance with embodiments.

The collection of the performance data can be performed by one or more performance measurement processes running on the client device 102. The performance measurement processes can be implemented by the execution of executable code, programs, or instructions (hereinafter "performance script") previously installed on the client device 102, embedded in the network documents, or otherwise provided to the client device 102. For example, a performance script can be embedded in or referenced by a network document that is provided to the client device 102. The execution of the performance script by the browser may cause implementation of the performance measurement processes such as illustrated in FIGS. 10-12. The performance script can be written using any client-side scripting language supported by the browser of the client device such as JavaScript, VBScript, Python, and the like. Alternatively, the performance script may be implemented using Java technologies (e.g., Java applets), ActiveX, and other client-side technologies. As yet another example, the performance measurement functionalities described herein may be implemented as part of a previously installed client application such as a mobile app, a browser-plugin, and the like.

The performance script can be configured to measure various performance data associated with one or more network documents or components thereof. In various embodiments, the collected performance data may be measured at the level of an individual digital asset, a set of digital assets, a network document, a set of network documents, a service, a website, a data center, or at any other suitable level of granularity. For instance, performance script may be configured to measure latencies (e.g., in seconds or milliseconds) associated with each of some or all of digital assets in a network document. As another example, the performance script may be configured to measure a page-level latency associated with an entire network document.

The client-side performance data as provided using techniques described herein is closely tracks the actual user-perceived performance when the network documents are rendered by the browser. Specifically, the provided client-side performance data is associated with an "active area" or "active portion" of a network document. An active area can be an area of a network document that is determined to be currently visible, audible, or otherwise of interest to a user. For instance, an active portion of a network document may be defined by a viewing region or viewport (i.e., visible portion) provided by a web browser. As another example, the active portion may include one or m more sub portions of the entire viewport. The position and/or dimension of the active portion may be determined by various software and/or hardware characteristics of the client device such as device type, display size, resolution, browser settings, and the like. Furthermore, the active portion may be dynamically changing as a user scrolls around in the browser window, changes browser window size, changes orientation of the client device, and the like.

In some embodiments, the performance data associated with the active portion (hereinafter "active performance data") is selected from previously collected performance data that may include performance data associated with the non-active portion (hereinafter "non-active performance data"). Alternatively, the active performance data may be collected without the collection of non-active performance data. In some embodiments, the client device 102 may be configured to selectively provide active performance data 114 to a performance server 106 for further processing. Alternatively, the client device 102 may be configured to provide both active and non-active performance data to the performance server 106. In some embodiments, the performance server 106 may be configured to identify the active performance data, for example, based on active portion information (e.g., coordinates of the active portion).

The performance server 106 may be configured to store, process, and/or analyze the client-side performance data as described herein (e.g., active performance data) to facilitate the improvement of future client-side performance. The processing of the performance data may include applying statistical analysis, data mining, and any other suitable techniques to the performance data. The processing of the performance data may be based on aggregate data from more than one client device or from a single client device over a period of time. Alternatively, the analysis may be performed based on one-time data. For instance, the analysis may be based on performance data from one client device received at one given point in time. Analysis of the performance data may reveal network documents or components thereof that are most likely to cause bottlenecks, excessive delays, or other user-perceived performance issues. Such network documents or components may be modified or otherwise optimized to improve the user-perceived performance such as reducing user-perceived latencies. In some cases, the performance data may be used to determine patterns or correlations between performance data and temporal, geographical, software- or hardware-related factors or characteristics of the client devices. For instance, the performance data for the same network document may be drastically different between client devices located in two different geographic areas (e.g., as identified by their Internet Protocol (IP) address) or time zones. Such difference, once identified, can be used to customize content delivery to the different client devices in order to improve client-side performance for the respective client devices.

The performance server 106 may be configured to provide result data 116 based on the analysis of the performance data to facilitate performance improvement. The result data 116 can be provided to a web server 104, a third-party system such as a content server 118, or any other suitable device or system. The result data 116 may include content data (e.g., network documents or digital assets) for client devices and/or instructions for content delivery. Regardless, the result data 116 is typically configured to improve subsequent client-side performance for one or more client devices.

Content data as part of the result data 116 may include network documents that are customized, optimized, or otherwise modified based on existing network documents so as to improve performance of specific client device or devices. For instance, the src tags of active digital assets (e.g., active digital assets with prolonged latency) may be updated to be directed to different data sources so as to reduce the time it takes to fetch those digital assets from the respective data sources. As another example, certain active digital assets that are likely to cause a bottleneck in performance (e.g., prolonged delay) may be replaced with "lighter" content that requires less time or other resources to load or render by the browser.

Instructions as part of the result data 116 may include human-readable files, machine-readable and/or executable code, and the like for a web server, a content provider server, or any other suitable device or system. For instance, the instructions may cause proactive and/or prioritized delivery of some or all active digital assets to the client devices. Additionally, the instructions may cause customized content to be provided for and/or customized content delivery methods to be utilized for the different client devices based on their respective performance characteristics. For instance, the instructions may cause a different set of content to be delivered to client device A than client device B based on different sets of active digital assets respectively associated with the client devices. For example, more content may be provided at a time to a client device A with a larger active portion than to client device B with a smaller active portion.

In some embodiments, client performance data may be correlated or otherwise combined with other factors to determine the ultimate content data and/or instructions for improving client-side performance. Examples of these factors may include current network conditions (e.g., congestion), availability and/or allocation of computing resources at the client devices and/or servers (e.g., memory, CPU, network bandwidth), physical location of a client or server device, and the like. For example, the proactive delivery of digital assets can be scheduled based on a current network condition and/or resource availability. For instance, more content delivery may be scheduled at night when the network is likely to be less congested than during the day. As another example, client devices with more and/or better computing resources may be provided with more content data.

Figure 2:
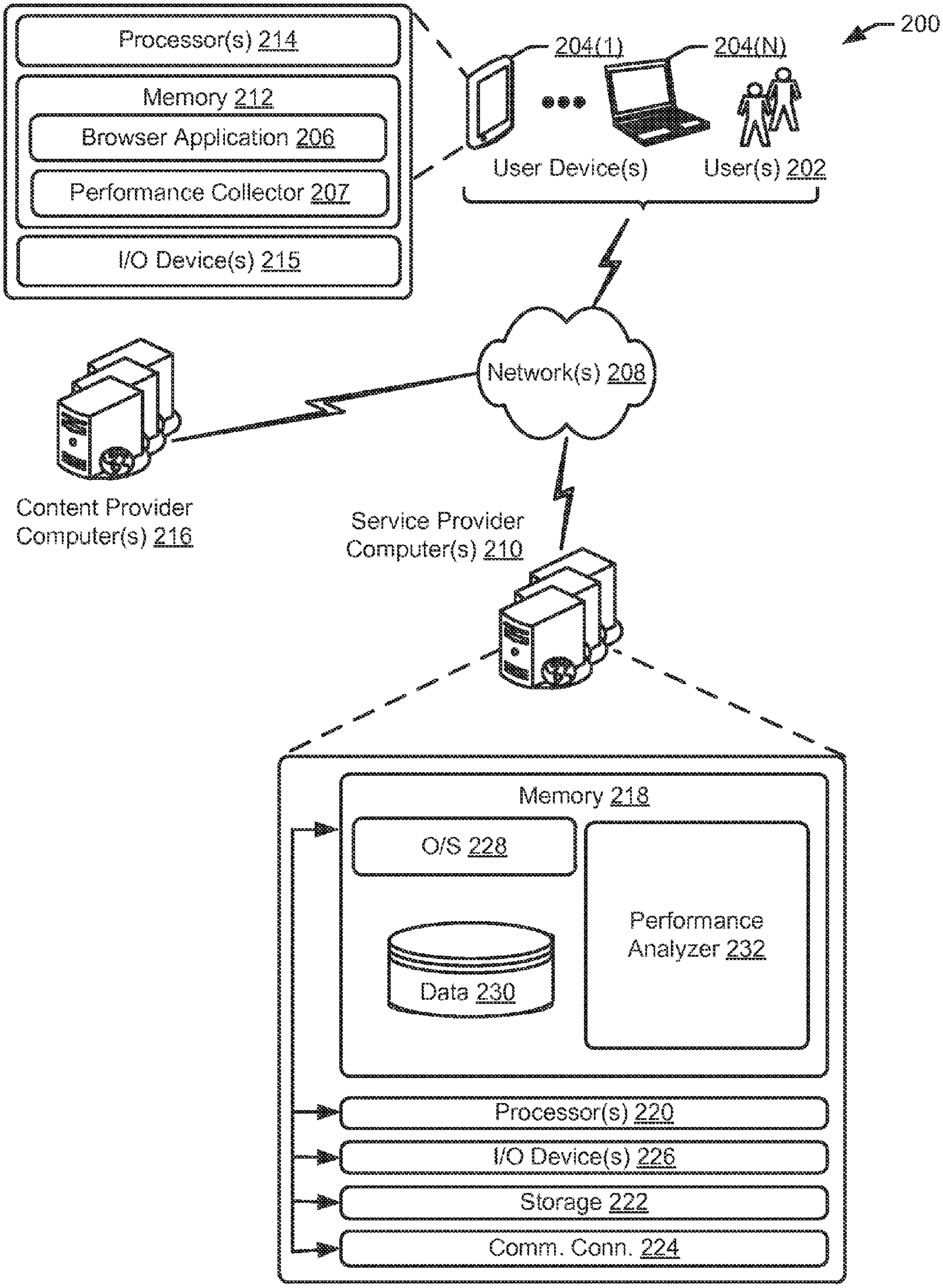
FIG. 2 illustrates another example environment for implementing client-side performance measurements, in accordance with embodiments.

FIG. 2 illustrates another example environment 200 for implementing client-side performance measurement, in accordance with embodiments. As illustrated, one or more user computing devices 204(1)-(N) (collectively, user devices 204) may be operably connected to one or more service provider computers 210 and one or more content provider computers 216 via one or more networks 208 to utilize the client-side performance measurement functionalities discussed herein. The one or more user devices 204, operable by one or more users 202, can be configured to allow users 202 to view and interact with content data provided by the service provider computers 210 and/or content provider computers 216 on displays (not shown) associated with the user devices. The user devices 204 can also be configured to collect performance data related to the rendering of the content data and provide such performance information to the service provider computers 210. The service provider computers 210 may be configured to analyze the performance data received from the user devices 204 so as to cause optimized and/or customized content delivery for the user devices 204.

The user devices 204 can include desktops, laptops, tablets, smartphones, mobile phones, personal digital assistants (PDAs), smart TVs, game consoles, wearable devices, or any other network-enabled devices capable of displaying content data. In one illustrative configuration, a user computing device 204 may include at least one memory 212 and one or more processing units or processor(s) 214. The processor(s) 214 may be implemented as appropriate in hardware, computer-executable instructions, firmware, or combinations thereof. Computer-executable instruction or firmware implementations of the processor(s) 214 may include computer-executable or machine-executable instructions written in any suitable programming language to perform the various functions described herein.

The memory 212 may store program instructions that are loadable and executable on the processor(s) 214, as well as data generated during the execution of these programs. Depending on the configuration and type of user device 204, the memory 212 may be volatile (such as random access memory (RAM)) and/or non-volatile (such as read-only memory (ROM), flash memory, etc.). The user device 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 212 may include multiple different types of memory, such as static random access memory (SRAM), dynamic random access memory (DRAM), or ROM. The one or more user devices 204 may also contain communication modules that allow the user devices to communicate with a local or remote data store, another computing device or server, user terminals and/or other devices on the networks 208. The user devices 204 may also include input/output devices 215. Input device(s) may include keyboard, mouse, stylus, joystick, microphone, touchpad or touch screen, and the like. Output device(s) may include touchscreen, projector, LCD screen, plasma screen, LED or OLED screen, television, monitor, and the like.

Turning to the components of the memory 212 in more detail, the memory 212 may include an operating system and one or more application programs, executable code, routines, scripts, or services for implementing the performance measurement functionalities disclosed herein. Browser applications 206 can include browser control or native application and can be configured to retrieve, present, and traverse information resources such as network documents (e.g., web pages), images, videos, behavior files, formatting files, and the like. The information resources may be identified by uniform resource identifiers (URIs) or uniform resource locators (URLs). In general, the browser application 206 can allow a user to interact with any type of network resources (e.g., websites) including social networking sites, electronic retailers, informational sites, blog sites, search engine sites, news and entertainment sites, and so forth. The described techniques can similarly be implemented outside of the browser application 206, such as with other applications running on the user device 204.

The memory 212 may also include instructions for a performance collector 207, which is configured to collect performance data related to the rendering of the content data by the browser application 206. In some embodiments, the instructions for the performance collector 206 may be written using JavaScript, VBScript, Python or any other language that is supported by the browser application 206. The instructions for the performance collector 207, when executed by the browser application 206, may cause the collection of client-side performance data such as described in further detail in FIGS. 10-12. For example, the performance collector 207 can be configured to collect latency information about digital assets contained in network documents as they are rendered by the browser application. In alternative embodiments, the performance collector 207 may be implemented as a standalone performance measurement application (e.g., mobile app) that may not require the browser application to execute. In various embodiments, the instructions for the performance collector 207 may be provided by a computer-readable medium (e.g., CD, USB stick, removable hard drive), service provider computers 210, content provider computers 216, or any other suitable providers.

The memory 212 may also be configured to store content data (e.g., network documents, images, videos, formatting files, behavior files, or other digital assets) such as retrieved by the browser application 206, performance measurement data (e.g., timing information or resource usage information associated with digital assets) such as measured by the performance collector 207, and/or user or device information such as user credentials (e.g., user IDs, passwords), device ID, cookies, IP address, location information, or the like. Additionally, the memory 212 may also store sensor data obtained from one or more sensors such as described below.

In some embodiments, the user device 204 may optionally include or be operably connected to one or more sensors (not shown). The sensors may be configured to detect a position, movement, orientation, pattern, or other characteristics of the user device 204 or any other objects surrounding the user device 204 (including a user 202 operating the user device). Examples of such sensors may include visual sensors (e.g., cameras), inertial sensors (e.g., gyroscope or accelerometers), motion sensors, proximity sensors, position sensors (e.g., compass, magnetometer, global positioning system (GPS) sensor), and the like. Sensor data obtained from such sensors may be used to define the active portion and to provide client-side performance data with improved accuracy and/or relevancy. For instance, a visual sensor may be used to track the gaze or eye movement. Such tracking may be used to determine an area of interest on the screen that a user is currently looking at or is likely to look at. As another example, movement or gesture sensors may be used to recognize user movement or gestures that indicate an area of interest for a user.

In some examples, the networks 208 may include any one or a combination of many different types of networks, such as cable networks, the Internet, wireless networks, cellular networks and other private and/or public networks. While the illustrated example represents the users 202 utilizing the browser application 206 over the networks 208, the described techniques may equally apply in instances where the users 202 interact with the one or more service provider computers 210 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

The one or more service provider computers 210 may be configured to, individually or collectively, perform backend functionalities related to client-side performance measurement and content delivery optimization as described herein. The functionalities provided by the one or more service providers 210 may be accessible via web-based or cloud-based services, APIs calls, remote procedural calls, and the like. For instance, the service provider computers 210 may be configured to receive performance data from the user devices 204, analyze the performance data to determine performance issues, patterns, correlations, and the like, and/or provide results of the analysis so as to facilitate improvement of client-side performance. In some embodiments, the service provider computers 210 may also be configured to provide, to the user devices 204, executable code (or script(s)) configured to cause selective collection of client-side performance information associated with an active portion of a network document at a time when the network document is loaded by the web browser of the user devices 204. The executable code may be executable by the web browser of the user devices 204 or some other applications on the user devices 204. The service provider computers 210 can also be configured to provide the content data to be measured (e.g., network documents and/or digital assets). For instance, the service provider computers 210 may include one or more web servers configured to provide the content data to the user devices 204. Alternatively, the content data to be measured may be provided by one or more third-party entities such as content provider computers 216 or other remote servers. In some other embodiments, both the executable code for performance measurement and content data to be measured are provided by some other entities, such as content provider computers 216 and/or other remote servers (not shown); and the service provider computers 210 may be configured to only receive and process performance data from the user devices, without providing the executable code for performance measurement or content data to be measured.

Besides functionalities related to client-side performance measurement, the service provider computers 210 may, in some examples, be configured to provide computing resources such as, but not limited to, client entities, low latency data storage, durable data storage, data access, management, virtualization, cloud-based software solutions, and the like. The one or more service provider computers 210 may also be operable to provide web hosting, computer application development, and/or implementation platforms, combinations of the foregoing, or the like to the one or more users 202.

The one or more service provider computers 210 may include any type of computing devices such as, but not limited to, mainframe servers, web servers, data servers, files servers, desktop computers, portable devices (e.g., laptops, mobile phones, tablet devices), and the like. Additionally, it should be noted that in some embodiments, the one or more service provider computers 210 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 210 may be in communication with the user device 204 via the networks 208, or via other network connections. The one or more service provider computers 210 may include one or more servers, perhaps arranged in a cluster or as individual servers not associated with one another. The one or more service provider computers 210 may be in communication with one or more third party computers 216 via networks 208.

In one illustrative configuration, the one or more service provider computers 210 may include at least one memory 218 and one or more processing units or processors(s) 220. The processor(s) 220 may be implemented as appropriate in hardware, computer-executable instructions, firmware, or combinations thereof. Computer-executable instruction or firmware implementations of the processor(s) 220 may include computer-executable or machine-executable instructions written in any suitable programming language to perform the various functions described. The memory 218 may store program instructions that are loadable and executable on the processor(s) 220, as well as data generated during the execution of these programs. Depending on the configuration and type of the one or more service provider computers 210, the memory 218 may be volatile (such as RAM) and/or non-volatile (such as ROM, flash memory, etc.). The one or more service provider computers 210 or servers may also include additional storage 222, which may include removable storage and/or non-removable storage. The additional storage 222 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 218 may include multiple different types of memory, such as SRAM, DRAM, or ROM.

The memory 218, the additional storage 222, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 218 and the additional storage 222 are all examples of computer storage media. Additional types of computer storage media that may be present in the one or more service provider computers 210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the one or more service provider computers 210. Combinations of any of the above should also be included within the scope of computer-readable media. Alternatively, computer-readable communication media may include computer-readable instructions, program modules, or other data transmitted within a data signal, such as a carrier wave, or other transmission. However, as used herein, computer-readable storage media does not include computer-readable communication media.

The one or more service provider computers 210 may also contain communication connection(s) 224 that allow the one or more service provider computers 210 to communicate with a data store, another computing device or server, user terminals and/or other devices on the networks 208. The service provider computers 208 may optionally include input/output devices 226. Input device(s) may include keyboard, mouse, stylus, joystick, microphone, touchpad or touch screen, and the like. Output device(s) may include touchscreen, projector, LCD screen, plasma screen, LED or OLED screen, television, monitor, and the like.

Turning to the contents of the memory 218 in more detail, the memory 218 may include an operating system 228, one or more data stores 230, and/or one or more application programs or services for implementing the features disclosed herein including a performance analyzer 232. The performance analyzer 232 may be configured to provide received client-side performance data associated with digital assets rendered on user devices 204 and analyze the performance data to determine ways for improving client-side performance. In some embodiments, the performance analyzer 232 and/or some other routines or processes running on the one or more service provider computers 210 may also be configured to provide other related functionalities such as providing the performance measurement code or instructions to the user devices 204, and/or providing performance analysis results (e.g., charts and/or diagrams, optimized data contents or instructions for optimizing content delivery) to web servers provided by the same service provider, third party content providers, data servers, or any other suitable entities. Further details of server functionalities are provided in the discussion of FIG. 13. Additionally, the memory 218 may store performance data obtained from the user devices, processing results and/or instructions generated based on the performance data, and any other relevant data.

In some embodiments, the environment 200 described herein may comprise one or more computing services provisioned from a "cloud computing" provider, for example, Amazon Elastic Compute Cloud ("Amazon EC2"), provided by Amazon.com. Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

In some embodiments, the user device 204, service provider computers 210, or content provider computers 216 may communicate with one or more data stores in order to perform the functionalities described herein. In various embodiments, such data stores may be operably connected to the user devices 204, service provider computers 210, and/or content provider computers 216 locally or remotely via a network. The data stores may include one or more data files, databases (e.g., SQL database), data storage devices (e.g., tape, hard disk, solid-state drive), data storage servers, or the like. In some embodiments, the data stores may comprise one or more storage services provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

Figure 3:
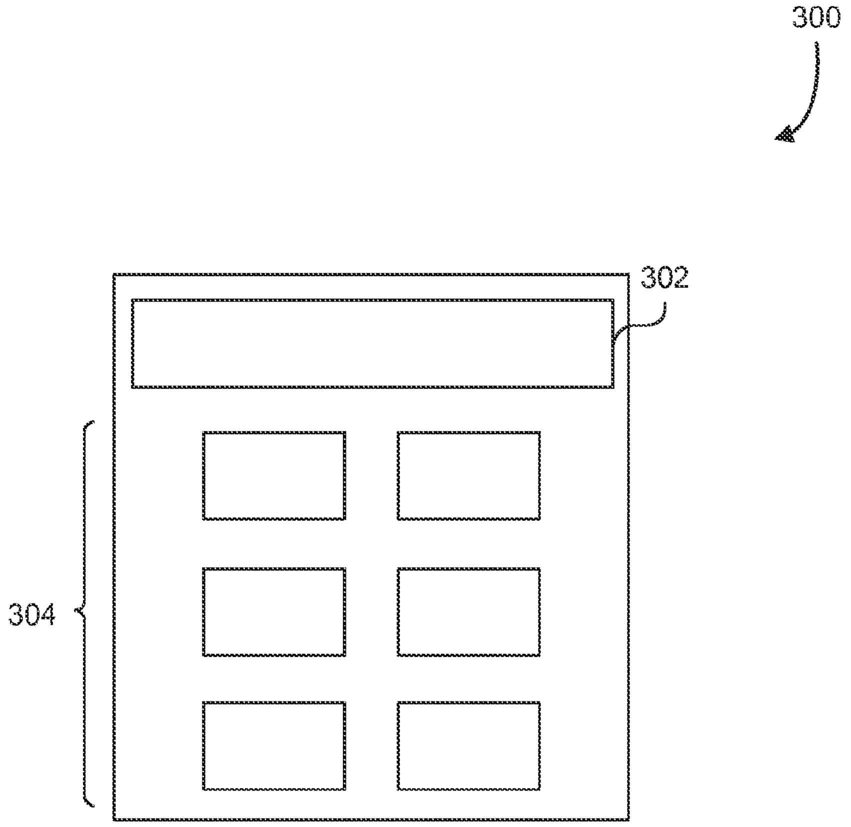
FIG. 3 illustrates an example network document that is provided to a client device, in accordance with embodiments.

FIG. 3 illustrates an example network document 300 that is provided to a client device, in accordance with embodiments. The network document can be associated with a performance script element 302 and other markup elements used to render a plurality of digital assets 304. The performance script element 302 may be written in JavaScript, VBScript, Python, or any other suitable scripting language that is supported by the client device. The performance script element 302 may be embedded in the network document itself or may be accessible via a reference embedded in the network document. The other markup elements 304 can include any HTML elements such as iframe, img, object, embed, link, script, and the like. These markup elements 304, when parsed and processed by the web browser, can be used to render text, images, video or audio files, animation, behavior files, formatting files, user interface (UI) controls, or other objects or digital assets 304. In an illustrative embodiment, the performance script 302, when executed by the web browser, may be configured to measure and collect performance data associated with the digital assets 304 on the network document. In some other embodiments, the performance script 302 may be configured to measure performance associated with digital assets that are included by network documents other than the network document that contains the performance script 302.

Figure 4:
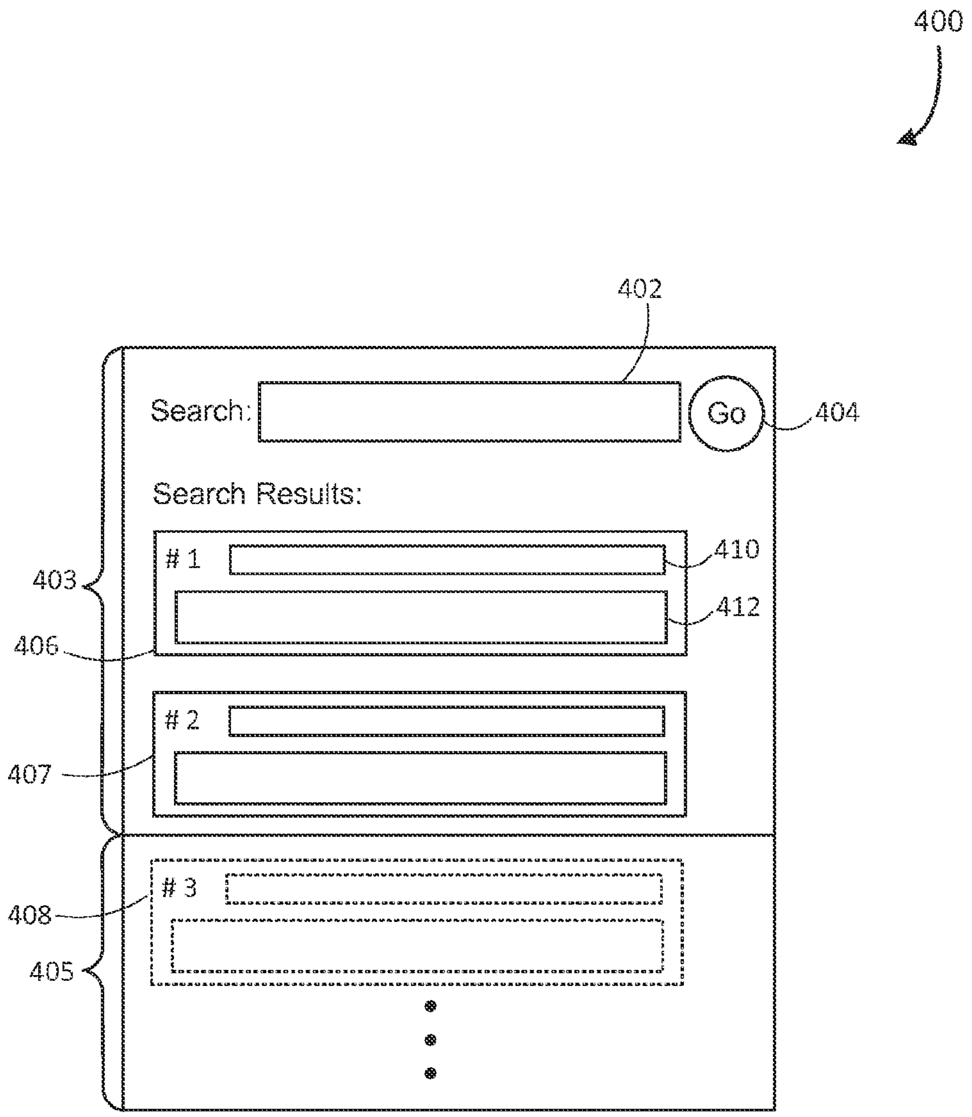
FIG. 4 illustrates an example network document as rendered by a web browser on a client device, in accordance with embodiments.

FIG. 4 illustrates an example network document 400 as rendered by a web browser on a client device, in accordance with embodiments. The illustrative network document 400 shows a user interface that can be used by a user to perform searches and to view search results. The search page includes a plurality of digital assets that are rendered by the web browser including a query input control 402 (e.g., a text field or text area) for a user to enter one or more search phrases or strings, a search button 404 to execute to the query in the query input control, and a plurality of search results 406, 407, 408, if any. Each search result 408 may include a link 410 (e.g., URL or URI) to the network document that contains the given search result and a mini details section 412 that shows some content from the linked network document in an inline fashion.

At a time the network document is rendered, the client browser window may not be large enough to accommodate all the digital assets of the network document. Instead, the network document may be divided into a visible portion 403 that is displayed in the browser window and an invisible portion 405 that is not shown in the browser window. In FIG. 3, for example, the visible portion 403 of the network document include only the query input control 402, search button 404, and the first two search results 406 and 407. While the other search results 408 are not shown in the browser window and may become visible when the user scrolls down in the browser window, for example. The visible portion of the network document may change dynamically, for example, when the user scrolls through the page or resize the browser window.

It may be desirable to determine a performance indicator associated with search page 400 illustrated in FIG. 4 so as to quantify a user's experience of the search user interface. For example, the performance indicator can include a latency indicator that tracks the user-perceived latency with respect to the load time of the network document. One approach is to consider the latency values of all the digital assets that need to be rendered on the search page to select the maximum latency value. However, such an approach may not accurately capture the user-perceived latency because it fails to take into account the positions of the digital assets relative to the visible portion of the network documents. At any given time, the user's perceived latency is likely to be directly tied to digital assets located in the visible portion of the network document, rather than those located in the non-visible portion. Hence, a better approach is to consider the latency values of only digital assets configured to be rendered in a currently visible portion of the network document to select the maximum latency value. To compare the above two approaches, assume that the network document includes three digital assets, digital asset #1, #2, and #3, which take 1 second, 2 seconds, and 3 seconds to load, respectively. Then under the first approach, the maximum latency would always be 3 seconds for digital asset #3. However, when only digital assets #1 and #2 are currently located in the visible portion of the network document and digital asset #3 is not (e.g., such as illustrated by the positions of search results #1 406, #2 407, and #3 408 in FIG. 4), then the latency of the digital asset #3 is not really relevant to the actual user-perceived latency. Rather, the user's perceived latency is likely tied only to the latencies of the digital assets located in the visible portion (e.g., digital assets #1 and #2). Hence, the more reasonable result should be 2 seconds of the digital asset #2 under the second approach, which tracks more closely with the actual user-experienced latency associated with a web page. From the user's perspective, when the browser window only shows digital assets #1 and #2, the user only has to wait for as long as it takes for both of them to load, not longer, because digital asset #3 is not visible to the user in the browser window. By taking into account the current rendering positions of the digital assets relative to the currently visible portion of the network document, the second approach can be used to quantify the user experience with the network document in a more accurate manner.

Figure 5:
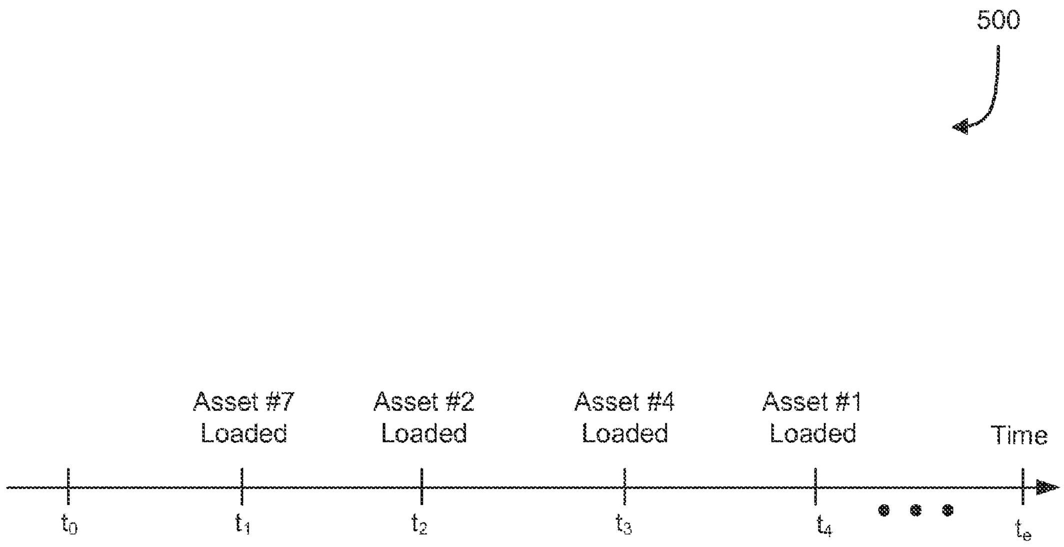
FIG. 5 illustrates an example timeline for loading digital assets in a network document, in accordance with embodiments.

FIG. 5 illustrates an example timeline 500 for loading digital assets in a network document, in accordance with embodiments. Time to indicates the start time for the loading of a network document (hereinafter page load). The page load start time can be calculated in a variety of ways. In an example, the page load start time is the time immediately after the last navigation command that causes the network document to load (e.g., a user's selecting on a link to the network document from another network document or clicking on the Back button of the web browser). As such, the page load start time is likely to capture the user-perceived start time for the page load. In other examples, the page load start time can be the time when a client-side cache is checked for a network document, the start time for fetching the network document from a server, the time immediately before or after the network document is processed by the web browser for rendering, or at any other suitable points in time.

Subsequent to the page load start time, various digital assets in the network document are loaded. The timeline 500 captures exemplary points in time when these digital assets are loaded. For instance, $t_1$, $t_2$, $t_3$, and $t_4$ indicate, respectively, when assets #7, #2, #4, and #1 are loaded. More assets may be loaded before the entire page is loaded, at $t_e$.

The user-perceived latencies such as discussed above and other client-side performance data can be captured, for example, by client-side browser scripts or processes. FIG. 6 illustrates example performance data that is collected for client-side performance measurement, in accordance with embodiments. The performance data illustrated may be used to track the performance during the loading of a network document, such as according to the timeline shown in FIG. 5. Tables 602 and 604 show alternative embodiments of data structures for storing performance data that is captured for a given network document. It is understood that performance data is shown here as being stored in tables for illustrative purposes only. In various embodiments, the performance data may be stored in any other suitable data structures such maps, lists, arrays, and the like.

The illustrative example shows the timing information associated with the loading of each digital asset in a network document. In an embodiment, such as illustrated by table 602, the timing information includes a current timestamp 608 at the time a digital asset is loaded. The timestamp 608 is associated with the corresponding asset ID 606, asset name, or any other identifier that can be used to identify the digital asset. Rather than storing timestamps, in another embodiment such as illustrated by table 604, the timing information can include a duration 612 for each associated asset ID 610. The duration can be the time that lapses between a start time and a finish time. The start time can be the page load start time to discussed in FIG. 5 and the finish time can be the time when a given digital asset is loaded. While loading latency information is shown as being collected in the illustrative examples, in various embodiments, other types of performance information can also be collected including other timing information (e.g., fetch time, response time), number and/or types of operations, resource usage, and the like.

Figure 7:
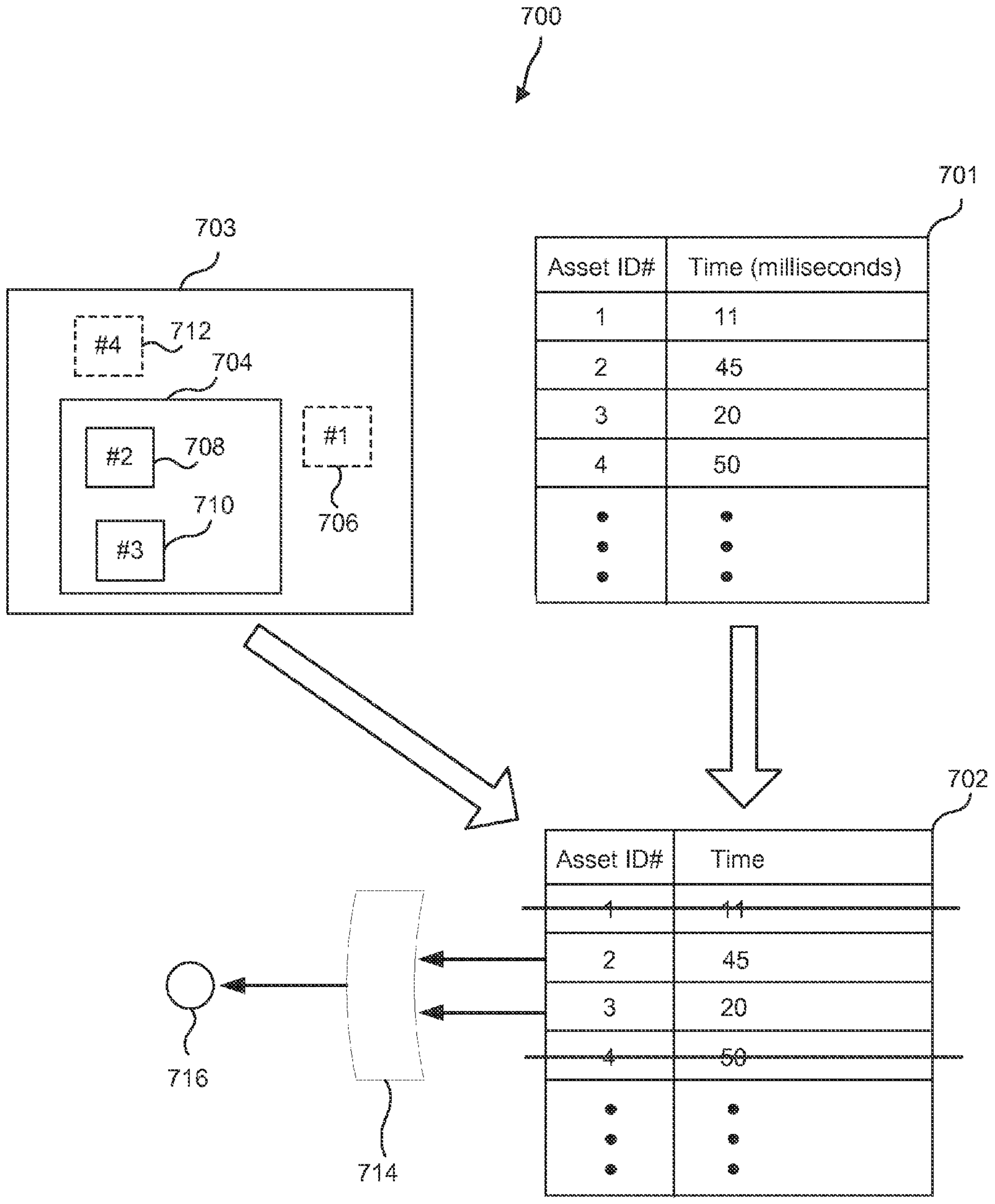
FIG. 7 illustrates an example process for generating a performance indicator based on example performance data of a network document, in accordance with embodiments.

The performance data for a given network document may be processed to generate a performance indicator that reflects the actual user-perceived performance of the network document. FIG. 7 illustrates an example process 700 for generating a performance indicator 716 based on example performance data 701 of a network document 703, in accordance with embodiments. The performance data 701 may be stored in a data structure similar to those illustrated in FIG. 6. For instance, the performance data may include the latency associated with the loading of each digital asset in the network document. The latency for asset ID #1, #2, #3, and #4 may be 11, 45, 20, and 50 milliseconds, respectively. The performance data 701 may be processed using information identifying an active portion of the network document when the network document is loaded such as illustrated on the top-left portion of FIG. 7. Assume, for example, that digital assets #2 708 and #3 710 are located within the active portion 704 of the network document 703 whereas digital assets #1 706 and #4 712 are located outside the active portion 704. Based on this information, the performance data 701 may be processed so that only the performance data associated with those digital assets in the active portion (i.e., digital asset #2 and #3) are selected for generating the performance indicator, such as illustrated at 702. The selected performance data may be used for one or more certain predetermined calculations or functions 714 to derive the performance indicator 716. The predetermined calculations or functions may include, for example, maximum, minimum, average, mean, linear-combination (e.g., sum), or non-linear combination. For instance, in an embodiment, a maximum of the selected performance data is selected from the selected performance data 702.

Figure 8:
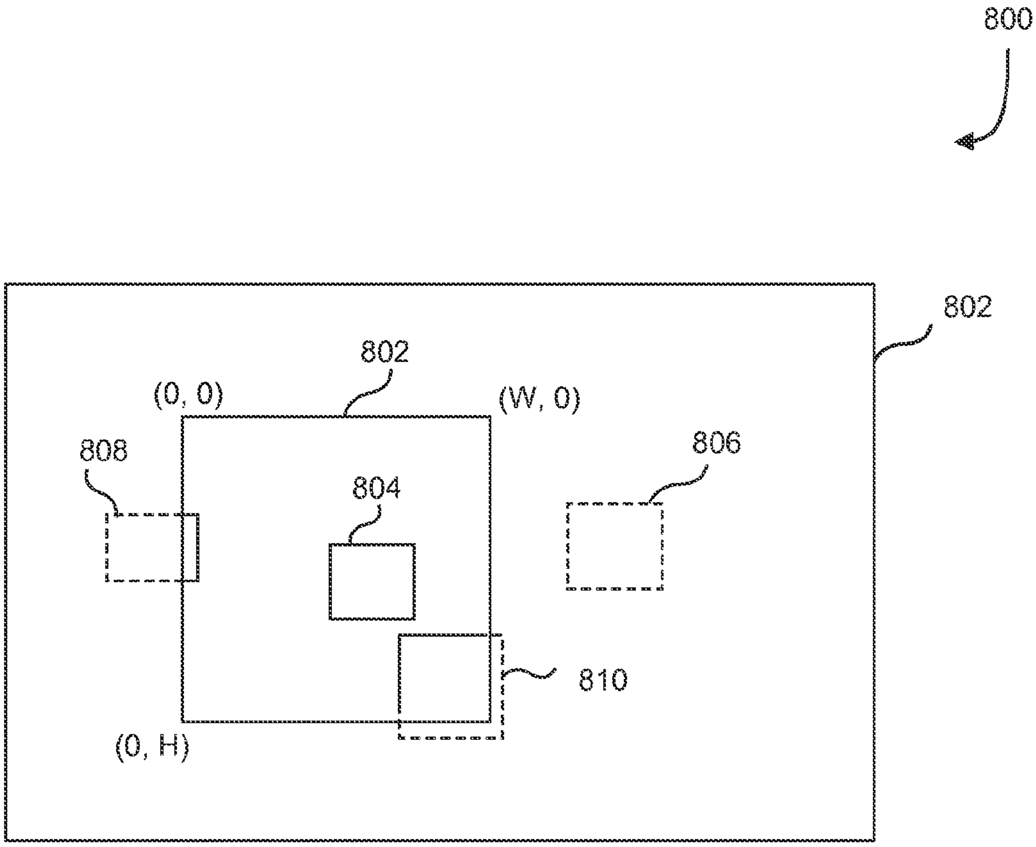
FIG. 8 illustrates example digital assets relative to an active portion of a network document, in accordance with embodiments.

In various embodiments, any suitable method can be used to determine whether a digital asset is considered within or outside an active portion of a network document. FIG. 8 illustrates example digital assets relative to an active portion 802 of a network document 802, in accordance with embodiments. As illustrated, a digital asset can be configured to be rendered entirely inside the boundary of the active portion of the network document (e.g., digital assets 804), entirely outside the boundary of the active portion (e.g., digital asset 806), or partially inside the boundary of the active portion (e.g., digital assets 808 and 810). In other words, a boundary of a digital asset may or may not overlap with the boundary of the active portion. The bounding areas of the active portion and the digital assets are shown as rectangles or bounding boxes for illustrative purposes only. In various embodiments, the bounding areas of the active portion and/or digital assets can include a circle, an oval, a polygon, or any other suitable shape.

In some embodiments, a digital asset may be considered within an active portion only when it falls entirely within the boundary of the active portion. For example, in FIG. 8, the digital asset 804 of FIG. 8 would be considered inside the active portion 802, whereas the digital assets 806, 808, and 810 would be considered outside the active portion 802. In some other embodiments, a digital asset may be considered within an active portion as long as its boundary overlaps at least partially with the boundary of the active portion. For example, in FIG. 8, the digital asset 804 of FIG. 8 would be considered inside the active portion 802, whereas the digital assets 806, 808, and 810 would be considered outside the active portion 802. In yet some other embodiments, a digital asset may be considered within an active portion when at least a certain threshold percentage of the bounding area of the digital asset overlaps with the active portion. Such threshold percentage may be 10%, 15%, 20%, 25%, 30%, 35%, 40%, 45%, 50%, 55%, 60%, 65%, 70%, 75%, 80%, 85%, 90%, 95%, or any other suitable value. For instance, assume the threshold percentage is 50%, then the digital asset 808 of FIG. 8 would not be considered inside the active portion 802 because the overlapping portion is less than 50% of the digital asset 808, whereas the digital asset 810 would be considered inside the active portion 802 because the overlapping portion is more than 50% of the digital asset 810. In yet some other embodiments, a digital asset may be considered within an active portion when at least a certain threshold percentage of the active portion overlaps with digital asset. Such threshold percentage may be 10%, 15%, 20%, 25%, 30%, 35%, 40%, 45%, 50%, 55%, 60%, 65%, 70%, 75%, 80%, 85%, 90%, 95%, or any other suitable value. In yet some other embodiments, a digital asset may be considered within an active portion when the digital asset overlaps with the active portion at certain designated areas. For instance, a digital asset may be considered inside an active portion if it overlaps with the lower-right corner of the active portion but not considered inside the active portion if it overlaps with the upper-left corner of the active portion.

Figure 9:
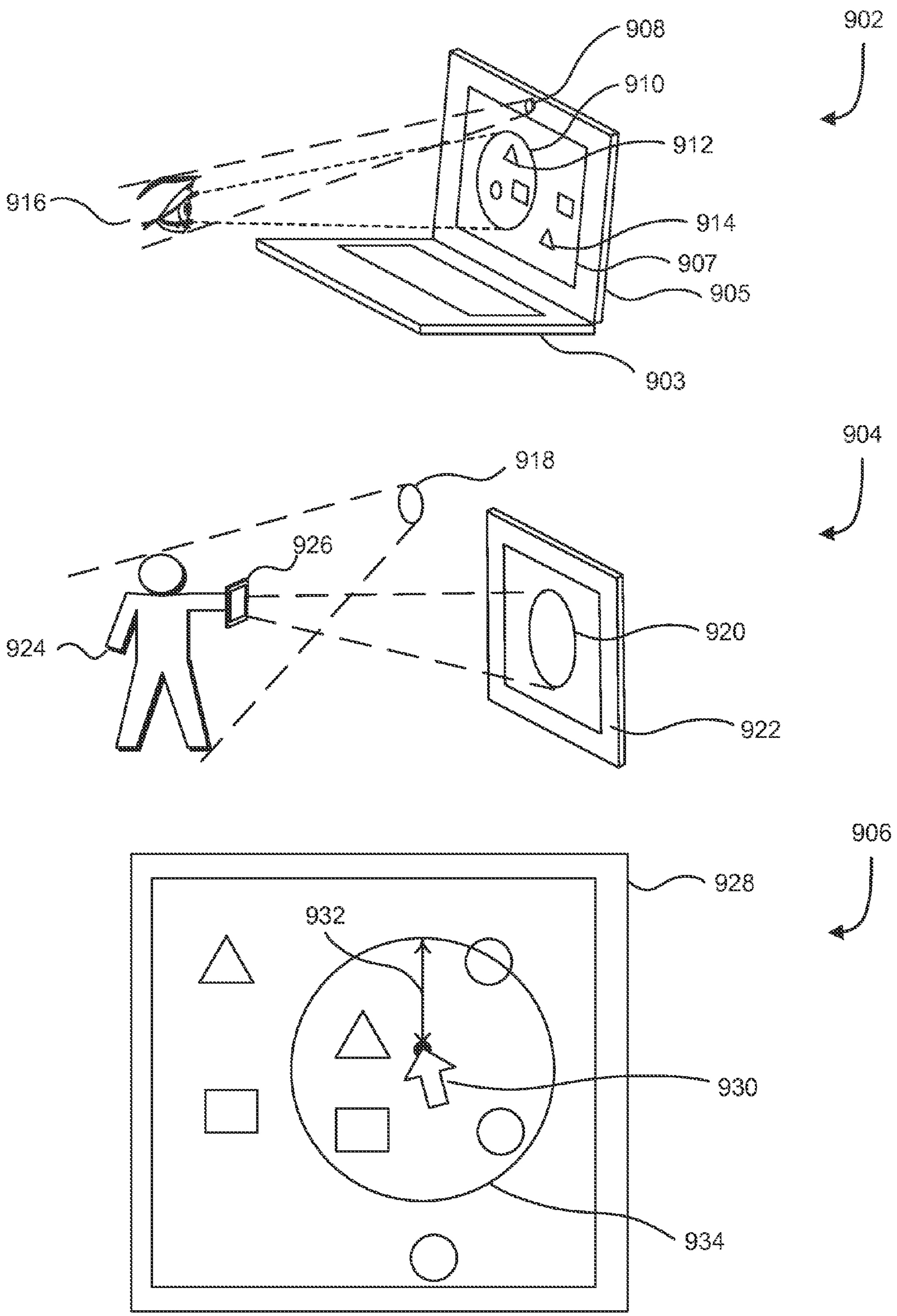
FIG. 9 illustrates some example methods for identifying an active portion of a network document, in accordance with embodiments.

Various methods may be used to identify an active portion of a network document and the positions of the digital assets relative to the active portion. In an embodiment, such information (e.g., coordinates of the active portion) may be provided by invoking an API provided by the web browser. FIG. 9 illustrates some example methods for identifying an active portion of a network document, in accordance with embodiments. Some methods may rely on sensors to derive the active portion. The sensors may be embedded in, coupled to, or otherwise operably connected to a client device configured to display network documents. The sensors may be configured to collect position, movement, or other sensor data for the client device and/or any object (including a human) in an environment surrounding the client device. Such sensor data may be provided to the client device and used to determine a currently active portion of a displayed network document. Examples of sensors may include visual sensors (e.g., cameras, video cameras, infrared sensors), proximity sensors (e.g., ultrasound sensors, lidar sensors), motion sensors, and the like.

In an illustrated embodiment 902, one or more eye-tracking sensors 908 may be used to track the position and/or movement of a user's eye or eyes 916 as the user views a network document displayed on a display 905 of a client device 903. The eye-tracking sensor(s) 908 may also be used to determine a distance between the user's eye(s) and the display 905. Information obtained from the eye-tracking sensor(s) 908 (e.g., images of the user's eyes) may be used to determine an active area 910 that the user may be looking at a given point of time. In a simplified embodiment, images obtained by the eye-tracking sensors may be analyzed using image processing techniques to determine a series of positions and/or movements of a user's eye within a given period of time. A series of areas (e.g., pixel areas) on the display corresponding to the series of movements may be calculated based at least in part on the spatial relationship (e.g., relative distance and/or angle) between the eye and the display. Finally, the active area may be calculated based on these series of areas. The determined active area 910 may be compared with the digital assets 912, 914 on the network document to determine which ones are considered within or outside the active area, such as discussed in FIG. 8. In some embodiments, the active area 912 may cover the entire visible display area or only a subarea thereof.

In another illustrated embodiment 904, one or more motion sensors 918 may be used to detect or track the position and/or movement of a user 924 including one or more body parts of the user such as a hand, an arm, or a head, facial expressions of the user, or the like. Alternatively or additionally, the sensors 918 may be used to detect and/or track the position and/or movement of a pointing device 926 held by, worn by, or otherwise coupled to the user 924. The pointing device 926 may be used by the user to indicate an area 920 on a display 922 that may be used to determine the active portion of a displayed network document.

In another illustrated embodiment 906, a current position of a mouse, a stylus, a finger, or any other input device 930 may be determined. An area within certain distance 932 from that position may be defined as the active portion 934 for the network document. The position of the input device 930 may be obtained via suitable API calls, in an embodiment.

FIG. 10 illustrates an example process 1000 for implementing client-side performance measurements, in accordance with embodiments. Aspects of the process 1000 may be performed, in some embodiments, by a client device such as discussed in connection with FIGS. 1 and 2. Some or all aspects of the process 1000 (or any other processes described herein, or variations and/or combinations thereof) may be performed under the control of one or more computer/control systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The order in which the operations are described is not intended to be construed as a limitation, and any number of the described operations may be combined in any order and/or in parallel to implement the processes.

The process 1000 can include receiving 1002 executable code for collecting performance data associated with network documents. The executable code may include a browser-executable performance script such as JavaScript, VBScript, or any other browser-supported script. Alternatively, the executable code may be implemented by a browser-plugin, a Java-enabled applet, an ActiveX control, a pre-installed client application, a mobile app, or any other suitable mechanism. The executable code may be provided to a client device in response to a request (e.g., HTTP request) from the client device. Alternatively, the executable code may be pushed to the client device by a web server.

The process 1000 can include causing 1004 execution of the executable code to collect client-side performance data associated with a network document. The executable code may be executed by a web browser such as described herein or any other suitable engine. The network document may be provided together with or separately from the executable code. The network document and the executable code may be provided by the same entity (e.g., same server, same computer system, or same service provider). Alternatively, the network document may be provided by one entity while the executable code may be provided by another entity. For instance, the executable code may be provided by a performance measurement service provider to measure client-side performance of network documents and other web-based content provided by other third-party content providers. While the discussion is provided in the context of a single network document, it is understood that the executable code may be configured to collect performance associated with more than one network document in a similar manner. Likewise, it is understood that the term executable code may refer to a single piece of code or a collection of programs.

The performance data associated with the network document can be collected during the loading of the network document by the web browser. As such, the collected performance data indicates client-side performance information as opposed to server-side performance information associated with the network document. The performance data can include timing information, number and/or types of operations, resource usage, and the like. In particular, the timing information can include latency information associated with various digital assets in the network documents. Such latency information can include the amount of time it takes for a digital asset to load by the web browser. In some embodiments, the latency information may include the time to retrieve the digital asset from a server or a client cache. Alternatively, the latency information may not include the time for such retrieval. In various embodiments, the collected performance data may be measured and collected at the level of an individual digital asset, a set of digital assets, a network document, a set of network documents, a service, a website, a data center, or at any other suitable level of granularity. In some cases, the performance data may be collected in response to certain predetermined events. For instance, timing information can be collected when various predetermined events occur. The predetermined events may be related to the rendering of the network document (e.g., loading of a digital asset) or triggered by UI actions (e.g., click of a mouse, selection of a link). Additionally or alternatively, the performance data may be collected on a continuous or periodic basis. For instance, resource usage information (e.g., memory, CPU, network bandwidth) may be measured at predetermined time intervals (e.g., every 2 seconds).

In some embodiments, performance data of substantially all digital assets in a network document is collected. Alternatively, some digital assets can be configured to be excluded from or included in the performance collection process. The exclusion and/or inclusion may be based on predetermined configuration parameters. For instance, such configuration parameters may include the type, size, source, and/or other characteristics of the digital assets to be included and/or excluded. The exclusion and/or inclusion may also be based on an opt-in/out indicator associated with a digital asset (e.g., a markup tag). Such indicator may be dynamically checked by the performance collection process to determine whether to collect performance data, and/or types of performance data to be collected.

The collected performance data can be selectively provided 1006 based on an active portion of the network document. As discussed herein, an active portion of the network document can include an area of the network document that is determined to be of particular interest to the user when the performance data is collected. For instance, the active portion can include a currently visible display area in a browser window (viewport). The viewport may be defined by a polygon (e.g., a rectangle), or any other suitable shape (e.g., an oval). The viewport may be expressed in normalized device coordinates or rendering-device-specific coordinates such as pixels from screen coordinates. In some cases, the active portion may be a subarea of the entire viewport. For instance, the active portion may include a subarea where the user is currently focusing her attention (e.g., with her eyes, mouse, or a pointing device). In various embodiments, the active portion may be subject to vary among different users, rendering devices, and network documents. For instance, factors such as display resolution, screen size, browser settings, and user preferences, can all affect the coordinates of an active portion. Even with the same user, same rendering device, and same network document, the active portion can vary dynamically, for example, as the user changes the orientation of the rendering device, scrolls the browser window, resizes the browser window, zooms in/out, moves her gaze around the screen, or moves her mouse or other pointing device. In some embodiments, an active portion of a network document may be identified programmatically using APIs (e.g., browser API). For instance, the coordinates of the current viewport may be determined by calling an API provided by the web browser. Alternatively or additionally, the active portion may be identified using various sensors associated with the client device such as discussed in connection with FIG. 9.

The active portion of the network document can be used to select the performance data. In an embodiment, the subset of the digital assets configured to be rendered within the active portion can be identified and the performance data associated with the identified subset of the digital assets can be selected. The selected performance can include one or more performance data points corresponding to the identified subset of the digital assets. For instance, the performance data points can include latency data points such as illustrated in FIGS. 6-7. The subset of the digital assets can be identified by comparing the boundary of the active portion with the boundaries of the digital assets. The boundaries of the active portion and the boundaries of the digital assets may be defined by coordinates and/or dimensions (e.g., width and height). In some embodiments, digital assets that overlap at least in part with the active portion are selected. In some other embodiments, only those digital assets that fall entirely within the active portion are selected. In yet some other embodiments, the digital assets may be selected according to any other suitable criteria (e.g., percentage of overlap).

In some embodiments, active digital assets (i.e., digital assets located within an active portion) and/or the performance data associated with the active digital assets can be identified directly without first identifying the active portion and then selecting the active digital assets. For instance, the web browser may provide an API for obtaining the active digital assets and/or performance data associated thereof.

In some embodiments, selectively providing the performance data further includes providing a performance indicator based on the performance data associated with the active portion of the network document. The performance indicator may be determined based on predetermined criteria or formulas. For example, the maximum latency value associated with a digital asset within the active portion of the network document may be selected to represent the user-perceived latency for the network document. In other embodiments, the performance indicators can include a minimum, an average, a mean, a linear combination, a non-linear combination, and the like, of the performance values of the active digital assets. Alternatively, the performance data associated with the selected active digital assets may be provided substantially as-is.

In some embodiments, the process 1006 may optionally include processing and/or analyzing selectively provided performance data (including one or more performance indicators). Results of such analysis may be used to determine ways to improve subsequent client-side performance. In various embodiments, the processing and/or analysis can be performed by a client device where the performance data is collected, by a different device or system (e.g., a remote performance server), or by a combination of both. Any suitable techniques such as statistical analysis and data mining may be used to identify issues, correlations, and/or patterns related to client-side performance. As an example, the performance data can be used to identify digital assets that cause the most user-perceived latencies for a particular user, a group of users, a client device or a group of client devices. Accordingly, aspects associated with the delivery of such digital assets can be optimized or customized to improve client-side performance. Such optimization or customization may include, for example, reducing the time for fetching the digital assets from servers and/or the time to render the digital assets. For instance, backend processes for retrieving web content (e.g., network documents and/or digital assets) may be modified to reduce the user-perceived latency. As another example, an order or a schedule for providing the web content may be modified to reduce latency. For instance, a digital asset that is likely to appear in an active portion may be provided to a client device at a higher priority than another digital asset that is not likely to appear in the active portion. As yet another example, the network documents may be modified so as to remove certain digital assets from an active portion of the network document where those certain digital assets are determined to cause substantial user-perceived latencies.

FIG. 11 illustrates an example process 1100 for collecting latency information associated with digital assets in a network document, in accordance with embodiments. Aspects of the process 1100 may be implemented, in some embodiments, by a client device such as discussed in connection with FIGS. 1 and 2. For instance, aspects of process 1100 may be performed by a performance collector 207 of FIG. 2. The performance collector 207 may be implemented as a browser-executable script such as JavaScript, VBScript, or the like. Alternatively or additionally, aspects of the process 1100 may be implemented by a server such as discussed in connection with FIGS. 1 and 2. In some embodiments, the process 1100 can be a part of the process 1000 (e.g., step 1104) discussed above.

The process 1100 can include recording 1102 a page load start time used to calculate a user-perceived latency for the network document. The page load start time may be defined in any suitable manner. In an example, the page load start time is the time immediately after the last navigation command that causes the current network document to load (e.g., a user's selecting on a link to the network document from another network document, selecting a browser control such as a Back or Refresh button). In another embodiment, the page load start time can include a time immediately before or after other client-server communication events required for the rendering of the network document such as a client device sending a request to a server, a server receiving a client request, a server sending a response to a client device, or a client device receiving a server response. The request and response discussed above may include HTTP requests and HTTP responses or any other suitable communication messages necessary for the rendering of the network document. In yet another embodiment, the page load start time can include a time immediately before or after a client-specific operation such as a lookup operation in a client cache or a server-specific operation such as a lookup operation in a server data store. In various embodiments, the page load start time may be recorded by a client device, a server, or both.

Once the network document starts to load, the performance data associated with each of a plurality of digital assets in the network document, such as latency information, can be recorded and/or updated as such performance data. Thus, the process 1100 can include determining 1104 whether there is any additional digital asset to load. If it is determined 1104 that an additional digital asset is to be loaded, then the process 1100 can include recording 1106 latency information associated with that digital asset. The recording of latency information may be performed by a script (e.g., JavaScript) that is executed immediately after a digital asset is loaded. The script may be invoked, for example, in response to an onload event associated with the digital asset. The performance data can be stored in a data structure similar to a table discussed in connection with FIG. 6. The recorded latency information may include a current timestamp and/or an elapsed duration since a predetermined start time (e.g., page load start time). Other performance data besides latency information may also be recorded in various embodiments.

In some embodiments, the data structure that is used to store the performance data may be initialized or refreshed when performance data for a new network document needs to be collected. The initialization can include removing any previously-stored performance data information associated with a previous network document. In some other embodiments, the performance data structure may not be refreshed between network documents or refreshed every few network documents. In various embodiments, the performance data may be stored in memory or any suitable transitory or non-transitory storage medium.

The recording of the latency information associated with each of the plurality of digital assets may continue until it is determined 1104 that there are no more assets to be loaded and the process 1100 ends 1108. In some embodiments, a page load end time may be optionally recorded as part of the performance data.

As discussed above, in some embodiments, digital assets may be configured to be excluded from or included in the performance collection process. As such, the process 1100 may optionally include determining, before recording 1106 latency information associated with a digital asset, whether performance data associated with the digital asset should be collected. Such determination may include checking opt-in/out information associated with the digital assets (e.g., based on an HTML tag or a configuration file).

FIG. 12 illustrates an example process 1200 for selectively providing performance information associated with a network document based on an active portion of the network document, in accordance with embodiments. Aspects of the process 1200 may be implemented, in some embodiments, by a client device such as discussed in connection with FIGS. 1 and 2. For instance, aspects of process 1200 may be performed by a performance collector 207 of FIG. 2. Alternatively or additionally, aspects of process 1200 may be implemented by a server such as discussed in connection with FIGS. 1 and 2. In some embodiments, some aspects of the process 1200 may be performed by a client device while other aspects of the process 1200 may be performed by a server.

The process 1200 can include obtaining 1202 performance data associated with a plurality of digital assets in a network document. The performance data may be obtained by the execution of a browser-executable performance script such as a JavaScript, VBScript, or any suitable client-side script when the network document is loaded in a web browser. For instance, the latency information associated with each of the digital assets may be collected using a process such as described above in connection with FIG. 11. Performance data other than latency information can also be collected in some embodiments.

The process 1200 can include identifying 1204 an active portion of the network document, which represents an area of interest at the time the network document is loaded. The area of interest may include a current display area of the browser window (viewport) or a subarea thereof. At any given time, the position and dimensions of the active portion may depend on a variety of factors such as device settings (e.g., screen size, resolution, and orientation), browser settings (e.g., display mode, placement of toolbars), user preferences, user actions (e.g., scrolling, zooming in/out), and the like.

According to an embodiment, identifying 1204 an active portion of a network of a network document includes identifying a browser window viewport. In some embodiments, coordinates and/or dimensions of the viewport such information can be obtained via the appropriate API calls to the web browser application used to render the network document. For instance, coordinates for the upper left corner of a rectangular viewport may be (0, 0). The width of the viewport may be obtained via window.innerWidth or document.documentElement.clientWidth. Similarly, the height of the viewport may be obtained using window.innerHeight or document.documentElement.clientHeight. The above JavaScript API calls are provided for illustrative purposes only. In various embodiments, other browser-supported API calls using any other suitable languages (e.g., VBScript or Python) may also be used where appropriate.

Alternatively or additionally, the active portion may be identified using sensor data provided by one or more sensors, such as described in connection with FIG. 9. The sensors may be configured to collect position, movement, or other characteristics associated with any object (including a human) in an environment surrounding a rendering or display device for the network document. Sensor data collected by such sensors can reflect how a user views or otherwise interacts with content displayed on the display device. As such, the sensor data may be used to determine a current area of interest for the user. For instance, such an area of interest may include an area on the display at which a user is currently looking. Such an area may be determined by tracking the position and/or movement of the user's eye or head. As another example, the area of interest may include an area around which the user is currently pointing, using a local or remote pointing device such as a mouse, a stylus, a remote controller, a wearable device, a smart phone, and the like. In various embodiments, the sensors used to identify the active portion may include visual sensors (e.g., cameras, video cameras, infrared sensors), proximity sensors (e.g., ultrasound sensors, lidar sensors), motion sensors, and the like.

Alternatively or additionally, the active portion may be identified based on other relevant data such as related to the user's navigation habits (e.g., search history, links clicked), user preferences (e.g., hobbies and interests), user information (e.g., user ID, geographic location, age), client device information (e.g., device type, device ID), and the like.

Once the active portion of the network document has been identified, the process 1200 can include identifying 1206 digital assets configured to be rendered in the active portion. As discussed above in connection with FIG. 8, a digital asset may be considered to be within the active portion when the digital asset overlaps at least partially with the active portion, when the digital asset overlaps entirely with the active portion, when the overlap portion exceeds a certain threshold, or according to any other suitable criteria. In some embodiments, coordinates of a bounding area of a digital asset can be determined, for example, via API calls to a browser application. Using JavaScript as an example, the top, left, bottom, and right coordinates of a bounding area of a digital asset may be obtained using getBoundingClient Rect( ).top, getBoundingClientRect( ).left, getBoundingClientRect( ).bottom, and getBoundingClientRect( ).right, respectively. Such coordinates of the bounding area of the digital asset may be compared with the coordinates of the active portion identified above (e.g., browser viewport or a sub area thereof) to determine whether and/or how much the digital asset overlaps with the active portion.

The performance data associated with digital assets within the active portion (or active digital assets) can be selected 1208. In some embodiments, a data structure used to store the performance data may be examined to identify the performance data associated with active digital assets. The data structure may be similar to the tables discussed in connection with FIGS. 6-7. For instance, entries in the table that correspond to the active digital assets may be tagged, marked, or otherwise selected to provide 1210 a performance indicator.

In some embodiments, active digital assets (i.e., digital assets located within an active portion) and/or the performance data associated with the active digital assets can be identified directly without first identifying the active portion and then selecting the active digital assets. For instance, the web browser application may provide an API for obtaining the active digital assets and/or performance data associated thereof.

The performance indicator may be determined based on predetermined criteria or formulas. For example, the maximum latency value associated with a digital asset within the active portion of the network document may be selected to represent a user-perceived latency for the network document. In some examples, the performance indicator that is provided can include an assent ID as well as the associated performance data. In other embodiments, the performance indicators can include a minimum, an average, a mean, a linear combination, a non-linear combination, and the like, of the performance values of the active digital assets. In some embodiments, the selected performance data may be sorted or otherwise processed to determine a performance indicator. In various embodiments, the selected performance data may or may not be provided with the performance indicator. For instance, in an embodiment, a performance indicator is not provided at all. Rather, only the selected performance data for the active digital assets may be provided.

Figure 14:
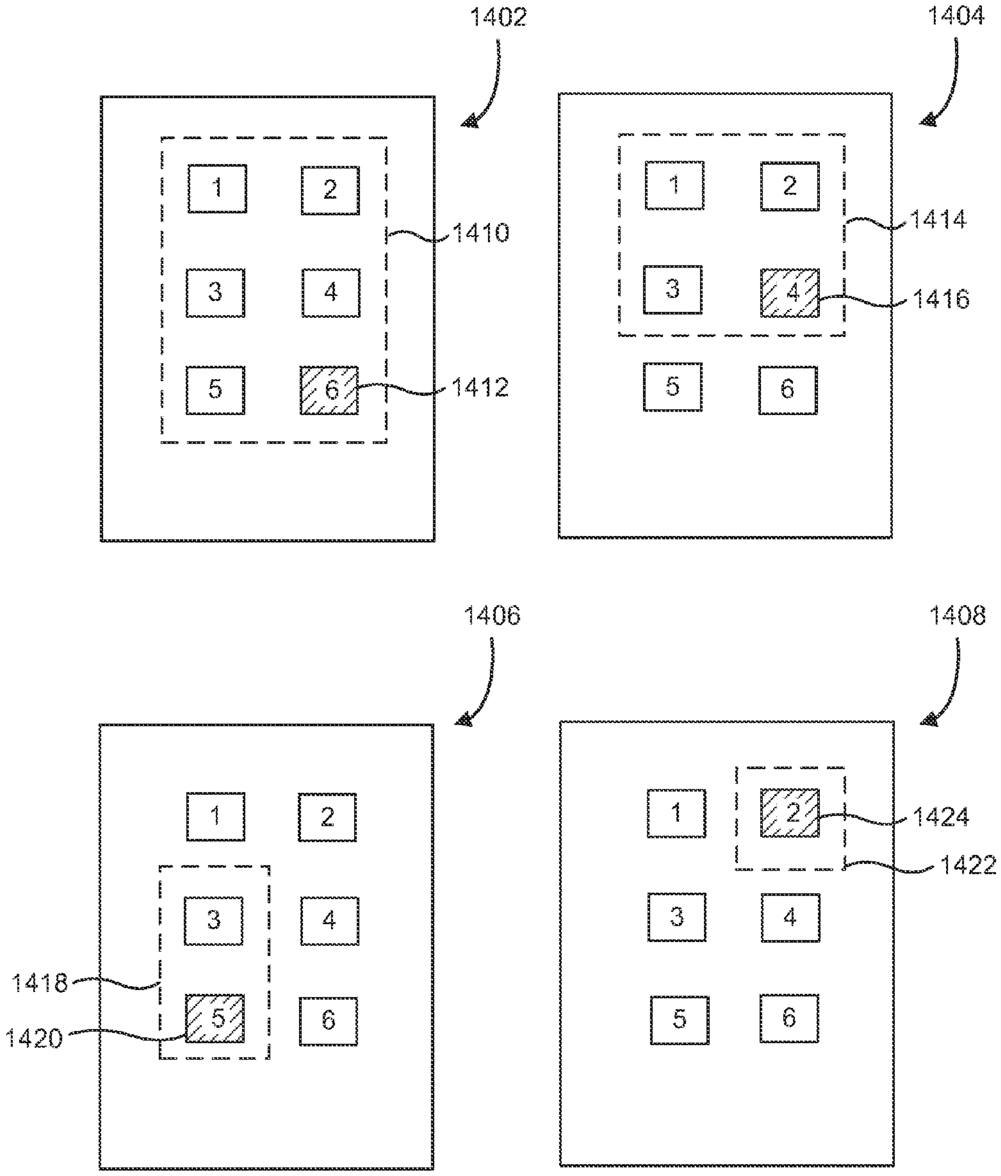
FIG. 14 illustrates some examples showing the selection of performance data based on an active portion, in accordance with embodiments.

For a given network document, the selected performance data and hence the performance indicator may vary depending on the current active portion for the network document. FIG. 14 illustrates some examples showing the selection of performance data based on an active portion, in accordance with embodiments. As illustrated, a network document may include six digital assets with respective increasing latencies 1, 2, 3, 4, 5, and 6. As illustrated by example 1402, when the active portion 1410 is large enough to accommodate all six digital assets, the performance data associated with all six digital assets is selected to derive the performance indicator, maximum latency. Hence, the latency indicator is 6, the maximum latency associated with the digital asset 1412 (shown in stripe) among all six digital assets. As illustrated by example 1404, the active portion 1414 may include only four of the six digital assets. In this case, the maximum latency is 4, the latency associated with the digital assets 1416 (shown in stripe), among the four digital assets within the active portion 1414. As illustrated by example 1406, the active portion 1418 may include only two of the six digital assets. In this case, the maximum latency is 5, the latency associated with the digital assets 1420 (shown in stripe), between the two digital assets within the active portion 1418. Lastly, as illustrated by example 1408, the active portion 1422 may include only one of the six digital assets. In this case, the maximum latency is 2, the latency associated with the only digital asset 1424 (shown in stripe) in the active portion 1422.

As illustrated by the above examples, performance data (including performance indicators) associated with a network document is selectively provided based on a dynamically determined active portion. Because the active portion is configured to track a user's current area of interest, the selectively provided performance data is likely to track the user-perceived performance associated with the network document.

Figure 13:
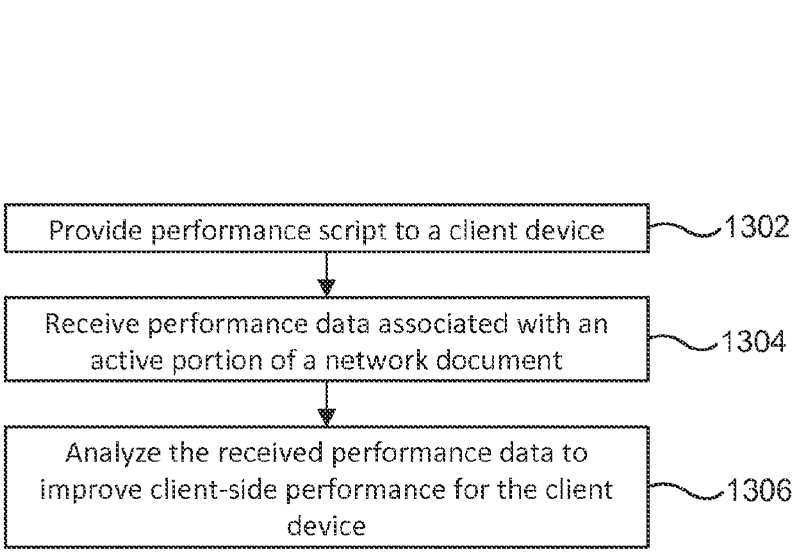
FIG. 13 illustrates an example process for optimizing client-side performance, in accordance with embodiments.

FIG. 13 illustrates an example process 1300 for optimizing client-side performance, in accordance with embodiments. Aspects of the process 1300 may be performed, in some embodiments, by one or more servers such as discussed in connection with FIG. 1 or one or more service provider computers as discussed in connection with FIG. 2. For instance, aspects of the process 1300 may be implemented by a performance analyzer 232.

The process 1300 can include providing 1302 a performance script to a client device. The performance script can include a browser-executable script written in JavaScript, VBScript, Python, or any other suitable browser-supported language. The performance script, when executed by a web browser on the client device, may be configured to selectively collect client-side performance information associated with an active portion of a network document when the network document is loaded by the web browser of the client device. Exemplary embodiments for selective collection of client-side performance information based on an active portion have been discussed above (e.g., in connection with FIGS. 7 and 10-12). The performance script may be provided as part of a network document that also contains other digital assets. Alternatively, the performance script may be provided separately from the other digital assets. In some embodiments, the performance script may be configured to measure client-side performance of network documents provided by the same entity that provides the performance script. Alternatively or additionally, the performance script may be configured to measure client-side performance of network documents provided by a different entity than the entity that provides the performance script. In some embodiments, the performance script may be provided to the client device in response to a client request (e.g., a HTTP request). Alternatively, the performance script may be "pushed" to the client device without the client device requesting it. In some embodiments, step 1302 may be optional and omitted from the process 1300. In such embodiments, the process 1300 may start with the receiving 1304 performance data collected by the performance script.

The process 1300 can include receiving 1304 the performance data associated with an active portion of a network document. The performance data can be associated with a subset of all the digital assets configured to be rendered in the active portion of the network document. The performance data may include latency information and/or other types of performance information discussed herein. In some embodiments, the performance data can include a performance indicator that indicates an aspect of user-perceived performance of a network document. For instance, the performance indicator may include a latency indicator representing a user-perceived latency associated with the network document. The latency indicator may be the maximum latency associated with a digital asset within the active portion. In an alternative embodiment, the performance data received from the client device may not include a performance indicator. In such an embodiment, the process 1300 may optionally include processing the received performance data to derive a performance indicator. In yet another embodiment, the performance data received from the client device may not be associated with the active portion. In such an embodiment, the process 1300 may optionally include determining the active portion and identifying a subset of the received performance data associated with the active portion. Determining the active portion may include receiving information about the active portion (e.g., coordinates) from the client device, or a third party device and selecting the performance data associated with the active portion based on the received information about the active portion.

Finally, the process 1300 can include analyzing 1306 the selectively collected performance data to improve client-performance for the client device. Such analysis may be based on aggregate data from more than one client device and/or data from a single client device over a period of time. Alternatively, the analysis may be performed based on one-time data.

Analysis of the performance data may reveal network documents or components thereof that are most likely to cause bottlenecks, excessive delays, or other user-perceived performance issues. For example, a digital asset that takes the longest to load may be identified based on the performance data associated with an active portion of a network document. Because the active portion represents a current area of interest for the user, the load latency thus identified is likely to reflect the real-time, user-perceived latency of the network document. The identification of such digital assets and the associated performance data can facilitate the improvement of client-side performance. For instance, the network documents or digital assets may be modified or otherwise optimized to reduce user-perceived latency. As an example, the src tags of active digital assets (i.e., digital assets that are likely to fall within an active portion of a network document) may be updated to be directed to different data sources so as to reduce the latency associated with the fetching of those digital assets from the respective data sources. As another example, certain active digital assets that are likely to cause a bottleneck or prolonged delays may be replaced with "lighter" content that requires less time to load.

The performance data may be compared, analyzed, correlated, or otherwise processed using statistical analysis, data mining, pattern recognition, or any other suitable data processing techniques. For instance, histograms of performance metrics may be generated for a given client device or a specific group of client devices to identify temporal, geographic, demographic, or other types of correlations. Such correlations may be used to customize content delivery between different processes running on the same client device, different users, different client devices, different groups of client devices, or the like. For instance, the performance data may reveal that the perceived latency for a network document is different for two different client devices. In particular, the active portion on one client device may cover a different set of digital assets than the active portion on the other client device, such as illustrated in FIG. 14. Such difference in active portions may be due to different device characteristics (e.g., display type, size, resolution), browser settings, user preferences, user actions (e.g., scrolling, zooming), and the like. Based on different performance data, different techniques may be used to improve client-side performance for the respective client devices.

Various aspects associated with the delivery of digital assets can be optimized or customized to improve client-side performance according to the analysis discussed above. Such optimization or customization may include, for example, reducing the time for fetching the digital assets from servers and/or the time to render the digital assets associated with the active portion. For instance, backend processes for retrieving web content (e.g., network documents and/or digital assets) may be modified to reduce latency associated with one or more of the digital assets within the active portion (e.g., the digital asset with the maximum latency). As another example, an order or a schedule for the delivery of content may be modified. For instance, a digital asset, within an active portion, may be provided to a client device at a higher priority than another digital asset that is not in the active portion. As yet another example, the network documents may be modified so as to remove certain digital assets from an active portion of the network document where those certain digital assets are determined to cause substantial user-perceived latencies.

Figure 15:
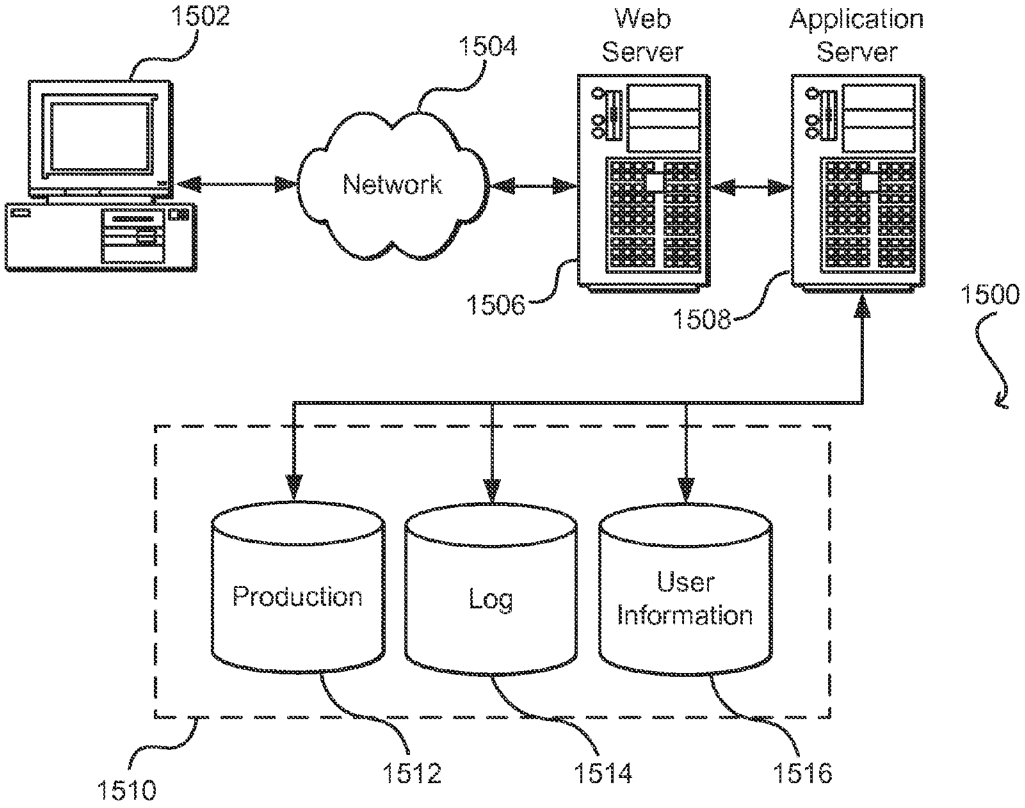
FIG. 15 illustrates an environment in which various embodiments can be implemented.

FIG. 15 illustrates aspects of an example environment 1500 for implementing aspects in accordance with various embodiments. As will be appreciated, although a Web-based environment is used for purposes of explanation, different environments may be used, as appropriate, to implement various embodiments. The environment includes an electronic client device 1502, which can include any appropriate device operable to send and receive requests, messages or information over an appropriate network 1504 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1506 for receiving requests and serving content in response thereto, although for other networks an alternative device serving a similar purpose could be used as would be apparent to one of ordinary skill in the art.

The illustrative environment includes at least one application server 1508 and a data store 1510. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1502 and the application server 1508, can be handled by the Web server. It should be understood that the Web and application servers are not required and are merely example components, as structured code discussed herein can be executed on any appropriate device or host machine as discussed elsewhere herein.

The data store 1510 can include several separate data tables, databases or other data storage mechanisms and media for storing data relating to a particular aspect. For example, the data store illustrated includes mechanisms for storing production data 1512 and user information 1516, which can be used to serve content for the production side. The data store also is shown to include a mechanism for storing log data 1514, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1510. The data store 1510 is operable, through logic associated therewith, to receive instructions from the application server 1508 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1502. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the system 1500 in FIG. 15 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java*, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X. Y, or Z," unless specifically stated otherwise, is intended to be understood within the context as used in general to present that an item, term, etc., may be either X. Y, or Z, or any combination thereof (e.g., X, Y, and/or Z). Thus, such disjunctive language is not generally intended to imply, and does not imply, that certain embodiments require at least one of X, at least one of Y, or at least one of Z to each be present or that certain embodiments require at least one of X, at least one Y, and at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for measuring user-perceived client-side performance of a web page, comprising:

receiving, by a performance server computer, client-side performance data that is collected at a client computing device, the client-side performance data including latency information respectively associated with a plurality of digital assets in the web page when the web page is rendered by a web browser of the client computing device;

identifying a viewport associated with the web page;

determining a subset of the plurality of digital assets configured to be rendered within the identified viewport;

selecting a subset of the client-side performance data including one or more latency data points of the collected latency information corresponding to the determined subset of the plurality of digital assets that overlap at least in part with the identified viewport;

identifying a latency indicator associated with the web page based at least in part on the selected subset of one or more data latency data points; and updating, by the performance server computer, the determined subset of the plurality of digital assets to utilize a different data source based at least in part on the subset of the client-side performance data that includes the selected subset of the one or more data latency data points thereby reducing latency associated with the determined subset of the plurality of digital assets.

2. The computer-implemented method of claim 1, wherein the plurality of digital assets comprises an image, an audio file, a video file, a multimedia object, a behavior file, or a formatting file.

3. The computer-implemented method of claim 1, wherein collection of the latency information respectively associated with the plurality of digital assets is caused by a browser-executable script running on the client computing device.

4. The computer-implemented method of claim 1, wherein identifying the latency indicator includes selecting a maximum latency value from the selected subset of one or more data latency data points.

5. The computer-implemented method of claim 1, wherein the viewport associated with the web page represents a portion of the web page that is visible in a browser window of the web browser.

6. One or more non-transitory computer-readable storage media storing computer-executable instructions that, when executed by a computing system, configure the computing system to perform operations comprising:

receiving, from a client device, client-side performance data associated with a plurality of digital assets in a network document in response to the client device receiving browser-executable code configured to cause collection of the client-side performance data;

identifying an active portion of the network document;

selecting a subset of the client-side performance data based at least in part on the identified active portion of the network document, the selecting comprising identifying a subset of the plurality of digital assets that overlap at least in part with the active portion and selecting the subset of the client-side performance data associated with the identified subset of the plurality of digital assets; and updating the subset of the plurality of digital assets to utilize a different data source based at least in part on the selected subset of the client-side performance data thereby reducing latency associated with the subset of the plurality of digital assets that overlap at least in part with the active portion.

7. The one or more non-transitory computer-readable storage media of claim 6, wherein the browser-executable code is received with the network document.

8. The one or more non-transitory computer-readable storage media of claim 6, wherein identifying the active portion of the network document includes identifying a visible portion of the network document configured to be displayed in a browser window rendered by a web browser.

9. The one or more non-transitory computer-readable storage media of claim 6, further comprising identifying a performance indicator based on the selected subset of client-side performance data.

10. The one or more non-transitory computer-readable storage media of claim 6, further comprising determining whether to collect performance data for at least one digital asset of the plurality of digital assets.

11. The one or more non-transitory computer-readable storage media of claim 6, wherein the selected subset of client-side performance data is used to generate customized content for the client device.

12. A computer system for improving user-perceived performance at a client device, comprising:

a memory that stores computer-executable instructions; and a processor configured to access the memory and execute the computer-executable instructions to at least:

provide a performance script to the client device, the performance script configured to measure client-side performance associated with an active portion of a network document, the active portion to be dynamically determined at a time when the network document is rendered by a web browser of the client device;

receive, from the client device, client-side performance data that is collected by the performance script when the network document is rendered by the web browser of the client device, the client-side performance data associated with the dynamically-determined active portion of the network document;

analyze the received client-side performance data so as to cause improved performance at the client device by selecting a subset of the received client-side performance data based on the active portion of the network document, the selecting comprising identifying a subset of a plurality of digital assets that overlap at least in part with the active portion of the network document and selecting the subset of the received client-side performance data associated with the identified subset of the plurality of digital assets; and update the subset of the plurality of digital assets to utilize a different data source based at least in part on the selected subset of the received client-side performance data thereby improving performance at the client device.

13. The computer system of claim 12, wherein the dynamically-determined active portion indicates an area of interest on the network document at a time when the network document is rendered by the web browser.

14. The computer system of claim 12, wherein the received client-side performance data comprises a performance indicator associated with the active portion of the network document.

15. The computer system of claim 14, wherein the performance indicator includes a maximum latency associated with the active portion of the network document.

16. The computer system of claim 12, wherein analyzing the received client-side performance data comprises correlating the received client-side performance data with client-side performance data from another client device.

17. The computer system of claim 12, wherein the computer-executable instructions, when executed by the processor, further configure the processor to at least cause a change in a loading order of the plurality of digital assets in the network document based at least in part on the received client-side performance data.

18. The computer system of claim 14, wherein the computer-executable instructions, when executed by the processor, further configure the processor to at least generate a second network document for the client device based at least in part on the received client-side performance data such that a second performance indicator associated with the second network document is better than the performance indicator.

* * * * *